United States Patent
Joyce et al.

(10) Patent No.: US 11,005,293 B2
(45) Date of Patent: *May 11, 2021

(54) BEAMFORMING FOR WIRELESS POWER TRANSFER

(71) Applicant: uBeam Inc., Marina Del Rey, CA (US)

(72) Inventors: Andrew Joyce, San Jose, CA (US); Rob Adamson, Halifax (CA); Dan MacDougall, Halifax (CA); Kate Latham, Halifax (CA); Josh Farrell, Halifax (CA)

(73) Assignee: uBeam Inc., Marina del Rey, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,855

(22) Filed: Mar. 11, 2019

(65) Prior Publication Data
US 2019/0229555 A1 Jul. 25, 2019

Related U.S. Application Data

(63) Continuation of application No. 15/399,431, filed on Jan. 5, 2017, now Pat. No. 10,230,271, which is a
(Continued)

(51) Int. Cl.
*H02J 50/10* (2016.01)
*H02J 50/90* (2016.01)
(Continued)

(52) U.S. Cl.
CPC .............. *H02J 50/10* (2016.02); *H02J 7/025* (2013.01); *H02J 50/15* (2016.02); *H02J 50/20* (2016.02); *H02J 50/80* (2016.02); *H02J 50/90* (2016.02)

(58) Field of Classification Search
CPC ..................................................... H02J 50/10
(Continued)

(56) References Cited

U.S. PATENT DOCUMENTS 6,335,618 B1 1/2002 Nahum
6,798,716 B1 9/2004 Charych
(Continued)

FOREIGN PATENT DOCUMENTS

CN 102592166 A 7/2012
CN 103168405 A 6/2013
(Continued)

OTHER PUBLICATIONS

Gezer, "Multi-beam digital antenna for radar, communications, and UAV tracking based on off-the-shelf wireless technologies", (20060000), URL: http://calhoun.nps.edu/bitstream/handle/10945/2583/06Sep_Gezer.pdf?sequence=1, (Apr. 10, 2017), XP055414163.
(Continued)

*Primary Examiner* — Joseph Chang
(74) *Attorney, Agent, or Firm* — Butzel Long

(57) ABSTRACT

Systems and techniques are provided for beamforming for wireless power transfer. A phase/amplitude map for a notional field in a plane of an aperture of the second wireless power transfer device may be determined. A Fourier transform may be performed on the phase/amplitude map for the notional field to generate a spatial frequency representation of the notional field. A phase/amplitude map for a second notional field in a plane of an aperture of the first wireless power transfer device may be determined based on the spatial frequency representation of the notional field and the position of the second wireless power transfer device. Control signals for transducer elements of the first wireless power transfer device may be generated based on the determined phase/amplitude map for the second notional field. The control signals for the transducer elements may be supplied to the transducer elements.

20 Claims, 17 Drawing Sheets

Related U.S. Application Data continuation-in-part of application No. 15/060,271, filed on Mar. 3, 2016, now Pat. No. 10,148,137.

(60) Provisional application No. 62/354,613, filed on Jun. 24, 2016.

(51) Int. Cl.
*H02J 50/15* (2016.01)
*H02J 50/80* (2016.01)
*H02J 50/20* (2016.01)
*H02J 7/02* (2016.01)

(58) Field of Classification Search
USPC ............................................. 307/104
See application file for complete search history.

(56) References Cited

U.S. PATENT DOCUMENTS

| | | | |
|---|---|---|---|
| 9,362,783 B2 | 6/2016 | Lee | |
| 9,912,199 B2 | 3/2018 | Leabman | |
| 10,230,271 B2 * | 3/2019 | Joyce | H02J 50/80 |
| 2005/0207589 A1 | 9/2005 | Biegelsen | |
| 2005/0285541 A1 | 12/2005 | Lechevalier | |
| 2007/0210960 A1 | 9/2007 | Rofougaran | |
| 2008/0114255 A1 | 5/2008 | Schwartz | |
| 2009/0284227 A1 | 11/2009 | Mohammadian | |
| 2009/0295386 A1 | 12/2009 | Sato | |
| 2011/0127846 A1 | 6/2011 | Urano | |
| 2012/0112552 A1 | 5/2012 | Baarman | |
| 2012/0195161 A1 | 8/2012 | Little | |
| 2012/0299540 A1 | 11/2012 | Perry | |
| 2013/0062964 A1 | 3/2013 | Chernokalov | |
| 2013/0207480 A1 | 8/2013 | Sheng | |
| 2013/0207604 A1 | 8/2013 | Zeine | |
| 2013/0241300 A1 | 9/2013 | Miyamoto | |
| 2013/0241468 A1 | 9/2013 | Moshfeghi | |
| 2014/0112095 A1 | 4/2014 | Medan | |
| 2014/0175893 A1 | 6/2014 | Sengupta | |
| 2014/0217967 A1 | 8/2014 | Zeine | |
| 2014/0243676 A1 | 8/2014 | Cogan | |
| 2014/0266021 A1 | 9/2014 | Paladeni | |
| 2015/0094887 A1 | 4/2015 | Kawashima | |
| 2015/0171512 A1 | 6/2015 | Chen | |
| 2016/0134126 A1 | 5/2016 | Tillotson | |

FOREIGN PATENT DOCUMENTS

| | | | |
|---|---|---|---|
| EP | 1744443 A1 | 1/2007 | |
| TW | 201131478 A | 9/2011 | |
| TW | 201249293 A | 12/2012 | |
| WO | 2015179225 A1 | 11/2015 | |

OTHER PUBLICATIONS

International Search Report and Written Opinion dated Apr. 26, 2017 as received in Application No. PCT/US2017/017834.

International Search Report and Written Opinion dated Sep. 11, 2017 issued in PCT/US2017/038337.

Extended European Search Report for Application No. 17816062.8, dated Jul. 1, 2019, 9 pages.

Extended European Search Report for Application No. EP17760469.1, dated Oct. 23, 2019, 11 pages.

Taiwanese Office Action for App. No. TW106121031, dated Jan. 13, 2021, 5 pages.

Taiwanese Office Action for App. No. TW106106822, dated Jan. 28, 2021, 2 pages.

* cited by examiner

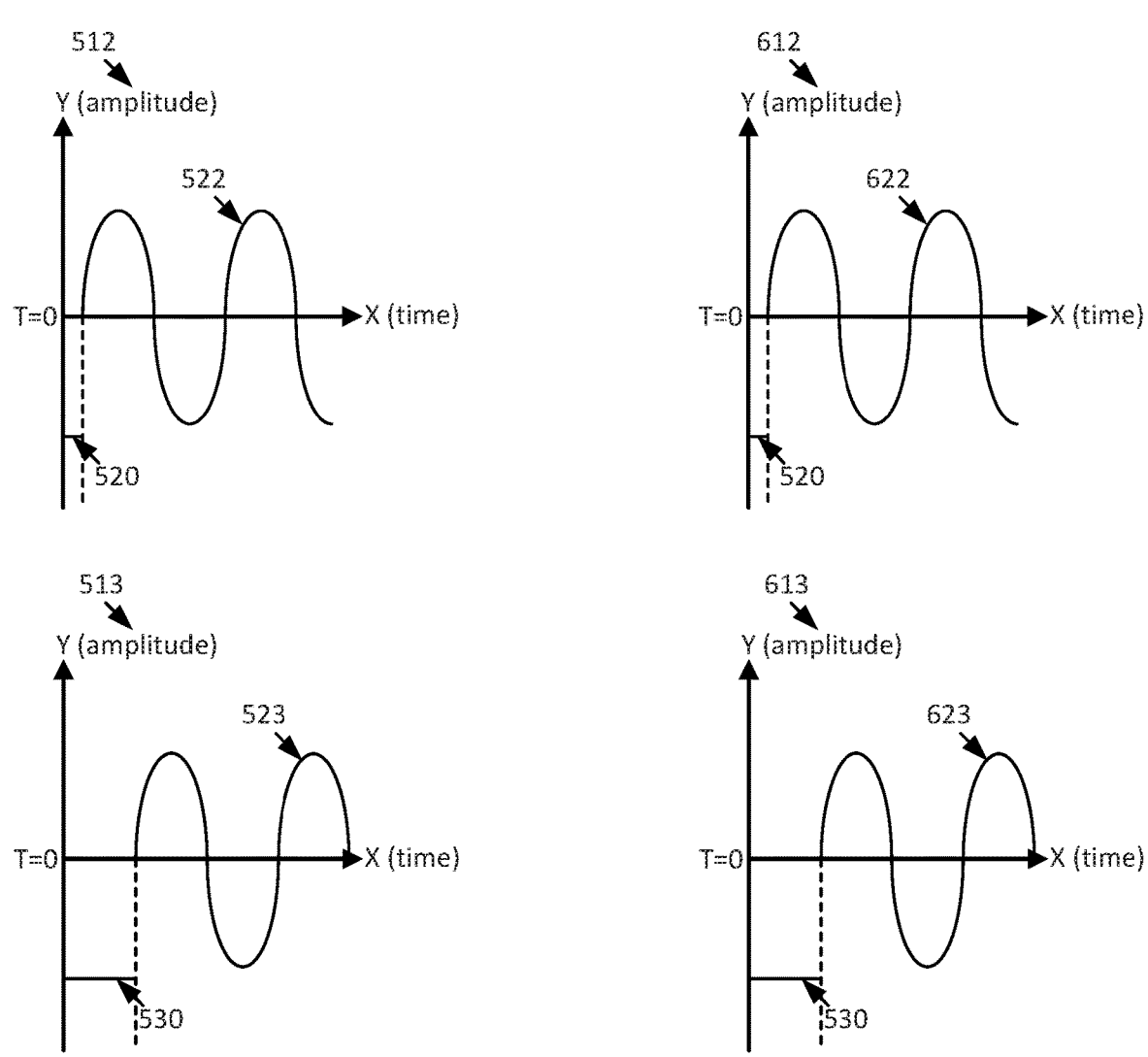

BEAMFORMING FOR WIRELESS POWER TRANSFER

BACKGROUND

Ultrasonic waves may be used to transfer power wirelessly between ultrasonic transducers. Multiple ultrasonic transducers may be used to transmit power to multiple ultrasonic transducers. The amount of usable power generated by the receiving ultrasonic transducers, and amount of rectification needed, may be affected by the spatial variations in phase among the ultrasonic waves as they are received at the receiving transducers. The spatial variations in phase may be due to the orientation of the receiving ultrasonic transducers relative to the transmitting ultrasonic transducers, variations in phase among the ultrasonic waves output by the transmitting ultrasonic transducers, and interference between the ultrasonic waves output by the transmitting ultrasonic transducers.

BRIEF SUMMARY

According to implementations of the disclosed subject matter, a position of a second wireless power transfer device relative to a first wireless power transfer device may be determined. A phase/amplitude map for a notional field in a plane of an aperture of the second wireless power transfer device may be determined. A Fourier transform may be performed on the phase/amplitude map for the notional field to generate a spatial frequency representation of the notional field in the plane of the aperture of the second wireless power transfer device. A phase/amplitude map for a second notional field in a plane of an aperture of the first wireless power transfer device may be determined based on the spatial frequency representation of the notional field in the plane of the aperture of the second wireless power transfer device and the position of the second wireless power transfer device. Control signals for transducer elements of the first wireless power transfer device may be generated based on the determined phase/amplitude map for the second notional field in the plane of the aperture of the first wireless power transfer device. The control signals for the transducer elements may be supplied to the transducer elements. Waveforms may be transmitted from the transducer elements based on the supplied control signals.

Systems and techniques disclosed herein may allow for beamforming for wireless power transfer. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 5 shows example waveforms suitable for beamforming for wireless power transfer according to an implementation of the disclosed subject matter.

FIG. 6 shows example waveforms suitable for beamforming for wireless power transfer according to an implementation of the disclosed subject matter.

DETAILED DESCRIPTION

Figure 1:
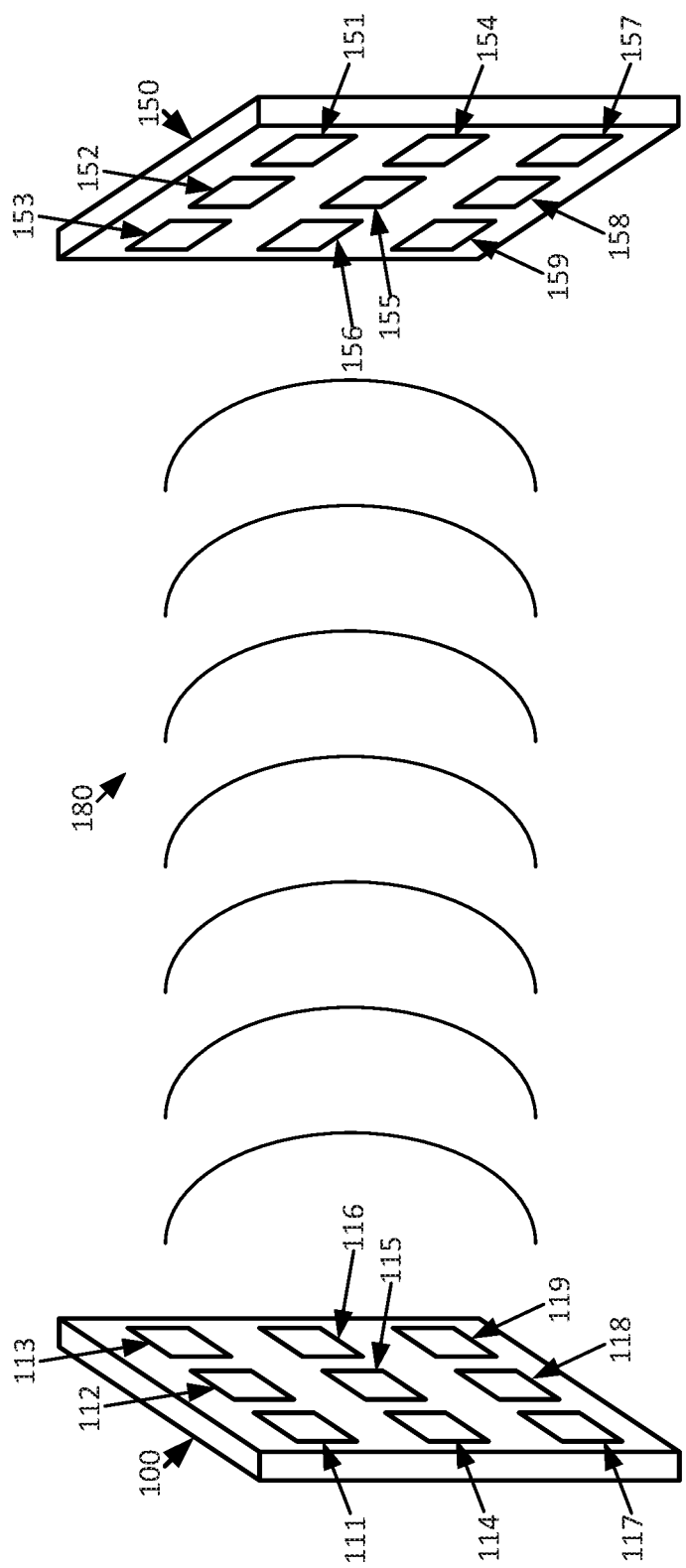
FIG. 1 shows an example arrangement suitable for beamforming for wireless power transfer according to an implementation of the disclosed subject matter.

According to embodiments disclosed herein, beamforming may be used in a wireless power transfer device. The output phase and amplitude of the elements of a wireless power transfer device may be controlled so that the waveforms carrying the transmitted energy present a wave front with a coherent phase when they arrive at the elements of the wireless power transfer device intended to receive the wireless power. The phase and amplitude of the elements of the transmitting wireless power transfer device may be controlled based on the relative positions of the wireless power transfer devices so that the wave front arrives at the receiving wireless power transfer device with a coherent phase regardless of the position of the receiving wireless power transfer device relative to the transmitting wireless power transfer device.

Beamforming for wireless power transfer may allow for the output of a wireless power transfer device to be controlled to present a coherent phase wave front with uniform amplitude to the elements of a receiving wireless power transfer device. A transmitting wireless power transfer device may receive a wave front of a beam generated by a receiving wireless power transfer device. The beam may originate with a coherent phase, uniform amplitude wave front generated by the elements of the receiving wireless power transfer device. The transmitting wireless power transfer device may determine the phase and amplitude of the wave front of the beam as experienced (received) at each element of the transmitting wireless power transfer device. The transmitting wireless power transfer device may generate control signals for its elements based on the determined phases of the wave front of the beam as experienced at its elements, maintaining phase differences across the elements. The control signals may be used to cause each element of the transmitting wireless power transfer device to transmit a waveform that is the same as that element's experience of the wave front from the receiving wireless power transfer device. This may result in the transmitting wireless power transfer device outputting waveforms that constitute a beam that arrives at the elements of the receiving wireless power transfer device as a wave front with coherent phase and uniform amplitude.

In some implementations, instead of receiving a wave front of a beam generated by the receiving wireless power transfer device before transmitting power to the receiving wireless power transfer device, the transmitting wireless power transfer device may simulate a beam with coherent phase and uniform amplitude transmitted from the receiving wireless power transfer device. The transmitting wireless power transfer device may determine the position of the receiving wireless power transfer device and its elements relative to the transmitting wireless power transfer device, including, for example, vertical and horizontal distance and angle and relative rotation or orientation. The transmitting wireless power transfer device may simulate the beam as originating from the elements for the receiving wireless power transfer device with coherent phase and uniform amplitude, and determine the phase and amplitude that would be experienced (received) by the elements of the transmitting wireless power transfer device upon the arrival of the wave front of the simulated beam. The transmitting wireless power transfer device may generate control signals for its elements based on the determined phases of the wave front of the simulated beam as experienced, in simulation, at its elements, maintaining phase differences across the elements. The control signals may be used to cause each element of the transmitting wireless power transfer device to transmit a waveform that is the same as that element's experience of the wave front of the simulated beam from the receiving wireless power transfer device. This may result in the transmitting wireless power transfer device outputting waveforms that constitute a beam that arrives at the elements of the receiving wireless power transfer device as a wave front with coherent phase and uniform amplitude.

A wireless power transfer device may be any suitable device that may be used for wireless power transfer. For example, a wireless power transfer device may be an ultrasonic transmitter, which may include a number of individual transducer elements. Each transducer element may be a separate vibrator of any suitable type, such as, for example, a piezoelectric cantilever with a free end and a fixed end. The ultrasonic transmitter may transmit wireless power through ultrasonic waves generated by the transducer elements. The transducer elements of an ultrasonic transmitter may be covered with a membrane, which may be any suitable material for assisting in the translation of the movement of the cantilever to movement of the transmission medium, which may be the air. A wireless power transfer device may be a radio frequency (RF) transmitter, which may transmit wireless power using RF waves, or an optical transmitter which may transmit wireless power using light from any suitable part of the light spectrum, including, infrared and ultraviolet light. A wireless power transfer device may be capable of sending wireless power, receiving wireless power, sending wireless communications, receiving wireless communications, and performing other functions, such as, for example, imaging and obstacle detection.

Wireless power may be transferred between wireless power transfer devices. For example, a transmitting wireless power device may transfer power to a receiving wireless power transfer device which may provide power to any suitable electronic or electric device, such as a smartphone, laptop, tablet, wearable electronic device, sensor package, electrical motor, or other electrical appliance. The power received by the wireless power transfer device may be used to directly power a device, or may be stored, for example, in a battery, capacitor, or any other suitable form of electrical or power storage. The transmitting wireless power transfer device may draw power from any suitable source, such as, for example, an AC or DC current generated in any suitable manner, including from a battery, or from an outlet connected to a power generator. The efficiency with which wireless power is transmitted between a transmitting wireless power transfer device and a receiving wireless power transfer device may be affected by the properties of the wave front that arrives at the elements of the receiving wireless power transfer device, and the variation in the properties of the wave front as experienced at those elements. A wave front which presents a coherent phase across the elements of the receiving wireless power transfer device may improve the efficiency of the transfer of wireless power, as less rectification of the current generated by the received power may be needed.

A beam originating with a coherent phase may be transmitted from the elements of a receiving wireless power transfer device. The receiving wireless power transfer device may be a target of wireless power from a transmitting wireless power transfer device. For example, the receiving wireless power transfer device may be a smartphone, and the transmitting wireless power transfer device may be a wall panel plugged into an outlet. The beam may be continuous, or may be pulsed. The beam may be transmitted by causing the elements of the receiving wireless power transfer device to generate waveforms that are all in phase, resulting in the beam originating with coherent phase. The transmitting wireless power transfer device may temporarily halt some or all transmission of wireless power and enter a receiving mode, for example, based on communication from the receiving wireless power transfer device indicating the receiving wireless power transfer device is going to transmit to the transmitting wireless power transfer device. The receiving wireless power transfer device may transmit the beam for a limited period of time. This may limit the amount of power used by the receiving wireless power transfer device when it is transmitting. This may, for example, avoid draining the battery of an electronic device.

The beam of the wave front transmitted by the receiving wireless power transfer device may arrive at the elements of the transmitting wireless power transfer device. The transmitting wireless power transfer device may analyze the properties of the wave front as experienced at each element, including the phase and amplitude experienced by each element. The phase and amplitude experienced at the elements of the transmitting wireless power transfer device may vary, for example, due to interference between the waveforms from the elements of the receiving wireless power transfer device on their route to the transmitting wireless power transfer device. The interference may be influenced by the relative positions, including locations and orientations, of the transmitting wireless power transfer device and receiving wireless power transfer device.

The elements of the transmitting wireless power transfer device may transmit waveforms based on the elements' experiences of the wave front from the receiving wireless power transfer device. For example, the transmitting wireless power transfer device may cause the elements to transmit waveforms that have the same phase differences as the elements' experiences of the wave front of the beam transmitted by the receiving wireless power transfer device. Any phase difference between the waveforms transmitted by any two elements of the transmitting wireless power transfer device may be based on the difference between the phases of the wave front of the beam from the receiving wireless power transfer device as experienced at the two elements. For example, if a first element of the transmitting wireless power transfer device experiences the wave front of the beam from the receiving wireless power transfer device with a phase difference of 15 degrees from a second element of the transmitting wireless power transfer device, the waveform transmitted by the first element may have a phase difference of 15 degrees from the waveform transmitted by the second element. The experienced phases of the wave front of the beam may result in the beam from the transmitting wireless power transfer device having a coherent phase wave front across the elements of the receiving wireless power transfer device. The beam may also be focused on the receiving wireless power transfer device, for example, reducing the amount of power from the elements of the transmitting wireless power transfer device that does not reach the receiving wireless power transfer device, for example, due to being part of the beam that misses the receiving wireless power transfer device.

The amplitude of the waveforms transmitted from the elements of the transmitting wireless power transfer device may be the same, or may be based on the amplitude of the wave front from the receiving wireless power transfer device as experienced by those elements. For example, elements which experienced a higher amplitude may transmit waveforms at a lower amplitude relative to elements which experienced a lower amplitude, as a phase conjugate of the received waveform normalized to a new power level, or all of the elements may transmit waveforms at the same amplitude regardless of the amplitude experienced at the element. This may result in the wave front of the beam from the transmitting wireless power transfer device having a uniform amplitude across the elements of the receiving wireless power transfer device.

The beam transmitted from the receiving wireless power transfer device may be continuous or may be pulsed, and may be transmitted at any suitable time or interval. For example, the receiving wireless power transfer device may transmit the beam originating with coherent phase before receiving any wireless power from the transmitting wireless power transfer device, or once, or at regular intervals while receiving wireless power. The receiving wireless power transfer device may transmit the beam after communicating with the transmitting wireless power transfer device either in-band through the same medium through which wireless power is transferred, or out-of-band, for example, using any suitable form of wired or wireless communication such as Bluetooth, Wi-Fi, or cellular communication. The communication may indicate to the transmitting wireless power transfer device that it should temporarily halt wireless power transmission to the receiving wireless power transfer device and prepare to receive the beam transmitted by the receiving wireless power transfer device. Re-transmitting the beam from the receiving wireless power transfer device may allow the phase and amplitude used by the elements of the transmitting wireless power transfer device to be updated, for example, to account for a change in relative position between the receiving and transmitting wireless power transfer devices, or to compensate for localized heating in proximity to the elements of the receiving wireless power transfer device that may result from absorption of the wave front and form a gas lens effect.

In some implementations, the transmitting wireless power transfer device may simulate the beam originating with a coherent phase from the receiving wireless power transfer device. The simulation of the beam may be based on the position of the receiving wireless power transfer device relative to the transmitting wireless power transfer device. The transmitting wireless power transfer device may determine the position of the receiving wireless power transfer device in any suitable manner. For example, the transmitting wireless power transfer device may request, or receive without requesting, position data from the receiving wireless power transfer device, such as, for example, accelerometer or gyroscope data, which may indicate the orientation of the receiving wireless power transfer device relative to the transmitting wireless power transfer device. Any suitable form of range finding may be used to determine the distance between the receiving wireless power transfer device and the transmitting wireless power transfer device. For example, elements of the transmitting wireless power transfer device may transmit waveforms at a given time. The receiving wireless power transfer device may receive the waveforms, and may send an indication of the time at which the waveforms were received to the transmitting wireless power transfer device using any suitable form of communication. The time-of-flight of the waveforms between the transmitting and receiving wireless power transfer devices and the type of wireless power transfer may be used to determine the distance between transmitting and receiving wireless power transfer devices. The transmitting wireless power transfer device may sweep the transmission of a beam over a given area, for example, using pulsed transmission at various angles, until the receiving wireless power transfer device indicates it received the beam, allowing for the determination of the direction of the receiving wireless power transfer device relative to the transmitting wireless power transfer device. The position of the receiving wireless power transfer device may also be determined by, for example, separate tracking or range-finding devices on either or both of the transmitting and receiving wireless power transfer devices. The position of the receiving wireless power transfer device may include the positions and orientations of elements on the receiving wireless power transfer device.

The transmitting wireless power transfer device may simulate the beam and its wave front in any suitable manner. For example, the transmitting wireless power transfer device may simulate a waveform transmitted from each element of the receiving wireless power transfer device. The beam may be simulated as being continuous or pulsed. The simulated waveforms may be simulated as having coherent phase at their origin. The transmitting wireless power transfer device may simulate the propagation of the waveforms from each element of the receiving wireless power transfer device, including any interference between the waveforms as they propagate away from the receiving wireless power transfer device. The simulation may be based on, for example, the type of wireless power transfer being used and the medium through which the waveforms travel, and may attempt to account for losses of amplitude during propagation. For example, if ultrasonic waves are used to transfer wireless power, the simulated waveforms may be simulated traveling through the air, and the simulation may account for the temperature and density of the air, for example, as determined by a thermometer and barometer of the transmitting or receiving wireless power transfer devices. The simulation may attempt to account for any loss in amplitude of the ultrasonic waves between the receiving and transmitting wireless power transfer devices due to transfer of energy to the air. The simulation may also account for the relative of position of the elements of the receiving wireless power transfer device and the directivity of waveforms generated by the elements. For example, the elements may be arranged in any suitable configuration, and may be arranged on any number of flat or curved planes of any suitable type. For example, the elements of the receiving wireless power transmitter may be arranged on the curved back of a smartphone, such that waveforms generated by the elements may not be directed in the same direction.

Simulating the interference between waveforms originating at the elements of the receiving wireless power transfer device with coherent phase and propagating away from the receiving wireless power transfer device may result in the simulation of a beam with a wave front arriving at the elements of the transmitting wireless power transfer device. Simulation of the waveforms may be performed until the simulated waveforms have reached a distance from the receiving wireless power transfer device that is equal to the distance between the transmitting and receiving wireless power transfer devices, indicating that the waveforms have been simulated up to their arrival at the elements of the transmitting wireless power transfer device. The simulation may be performed with any suitable level of granularity. For example, the simulation may simulate the waveforms from the receiving wireless power transfer device to the transmitting wireless power transfer device at regular intervals of $\frac{1}{100000}$ of a second. The simulation may stop with a simulated wave front, resulting from the simulated waveforms, that has reached all of the elements of the transmitting wireless power transfer device that can be reached by the wave front based on their relative positions. The transmitting wireless power transfer device may determine how each element of the transmitting wireless power transfer device would experience the simulated wave front resulting from the simulated waveforms, based on the properties of the simulated wave front at the positions of the elements of the transmitting wireless power transfer device. The transmitting wireless power transfer device may, for example, determine the phase and amplitude of the simulated wave front at the position of each element of the transmitting wireless power transfer device. The simulation may also be performed based on any suitable calculation or approximation which may determine the properties of the simulated wave front as it would be experienced on arrival at the elements of the transmitting wireless power transfer device based on the properties of the waveforms originating at the elements of the receiving wireless power transfer device. The calculation or approximation may allow for simulation of the waveforms, and the wave front, as it travels between the receiving wireless power transfer device and the transmitting wireless power transfer device to be skipped. The wave front at the elements of the transmitting wireless power transfer device may be determined directly from the properties of the wave front at its origin at the receiving wireless power transfer device. This may allow for faster determination of the properties of the simulated wave front at the elements of the transmitting wireless power transfer device and faster determination of waveforms that should be transmitted by the elements of the transmitting wireless power transfer device, allowing for the transmitting wireless power transfer device to alter its beam to keep up with changes in the relative positioning of the transmitting and receiving wireless power transfer devices.

The elements of the transmitting wireless power transfer device may transmit waveforms that are the same as the elements' simulated experiences of the wave front of the simulated beam from the receiving wireless power transfer device. For example, the transmitting wireless power transfer device may cause the elements to transmit have the same phase differences as the elements' simulated experiences of the wave front of the simulated beam. Any phase difference between the waveforms transmitted by any two elements of the transmitting wireless power transfer device may be based on the difference between the phases of the wave front of the simulated beam as experienced in simulation at the two elements. For example, if a first element of the transmitting wireless power transfer device experiences the wave front of the same with a phase difference of 15 degrees from a second element of the transmitting wireless power transfer device, the waveform transmitted by the first element may have phase difference of 15 degrees from the waveform transmitted by the second element. Transmitting waveforms using the experienced phases of the wave front of the simulated beam may result in the beam from the transmitting wireless power transfer device having a coherent phase wave front across the elements of the receiving wireless power transfer device. The beam may also be focused on the receiving wireless power transfer device, for example, reducing the amount of power from the elements of the transmitting wireless power transfer device that does not reach the receiving wireless power transfer device, for example, due to being part of the beam that misses the receiving wireless power transfer device.

The amplitude of the waveforms transmitted from the elements of the transmitting wireless power transfer device may be the same, or may be based on the amplitude of the wave front of the simulated beam as experienced in simulation by those elements. For example, elements which experienced a higher amplitude in simulation may transmit waveforms at a lower amplitude relative to elements which experienced a lower amplitude in simulation, as a phase conjugate of the received waveform normalized to a new power level, or all of the elements may transmit waveforms at the same amplitude regardless of the amplitude experienced at the element in simulation. This may result in the wave front of the beam from the transmitting wireless power transfer device having a uniform amplitude across the elements of the receiving wireless power transfer device.

Simulation of the beam originating at the receiving wireless power transfer device may be performed at any suitable time, and may be repeated at any suitable intervals. For example, the simulation may be first performed based on a communication from the receiving wireless power transfer device requesting wireless power from the transmitting wireless power transfer device. The transmitting wireless power transfer device may perform the simulation of the beam, and then may begin transmitting wireless power to the receiving wireless power transfer device based on the results of the simulation. The transmitting wireless power transfer device may perform the simulation of the beam again at any suitable intervals. For example, the simulation may be performed on a regular update cycle, based on detecting that the position of the receiving wireless power transfer device relative to the transmitting wireless power transfer device has changed, or based on communications from the receiving wireless power transfer device which may indicate, for example, that the receiving wireless power transfer device requires more or less power or has moved, or may include feedback indicating the phase and amplitude of the wave front of the beam from the transmitting wireless power transfer device as experienced at the receiving wireless power transfer device.

The experience of the wave front of the simulated beam may be simulated in parallel for the elements of the transmitting wireless power transfer device. The experience of the wave front of the simulated beam by any individual element of the transmitting wireless power transfer device may be simulated independently of the experience of the wave front of the simulated beam by any other individual element of the transmitting wireless power transfer device. For example, the relative Euclidean distance and angle between an element of the transmitting wireless power transfer device and each element of the receiving wireless power transfer device for which a waveform is being simulated may be used to determine the properties, including relative phase, amplitude, and directivity, of the wave front of the simulated beam as it would be experienced at the element of the transmitting wireless power transfer device. This determination may made independently for each element of the transmitting wireless power transfer device, which may allow the properties of the wave front of the simulated beam as experienced at each element of the wireless power transfer device to be determined via simulation in parallel.

In some implementations, the simulation may determine the experience of the wave front of the simulated beam at a subset of the elements of the transmitting wireless power transfer device. For example, the simulation may determine how a uniform sample of elements, for example, every second element, or a random sample of elements, of the transmitting wireless power transfer device would experience the wave front of the simulated beam originating at the elements of the receiving wireless power transfer device. Elements for which the experience of the wave front of the simulated beam is not simulated may transmit with a phase and amplitude that is based on the phase and amplitude used by neighboring or nearby elements for which the experience of the wave front of the simulated beam was simulated. For example, an element for which no simulation was performed may transmit using the same phase and amplitude as the nearest element for which a simulation was performed, a modified phase and amplitude based on the phase and amplitude used by the nearest element for which a simulation was performed, or a phase and amplitude that is an average of, or based on an interpolation of, several neighboring or nearby elements for which a simulation was performed. Further simulations may be performed, for example, at suitable intervals, such as on a regular update cycle, which may simulate elements of the transmitting wireless power transfer device for which simulations were not previously performed. This may allow for further focusing of the beam from the transmitting wireless power transfer device, resulting in a more coherent phase wave front being experienced across the elements of the receiving wireless power transfer device. As simulation of the experience of the wave front of the simulated beam is performed for additional elements, those elements may begin to transmit waveforms based on the result of the simulation instead of waveforms copied from neighbors or based on interpolation. New simulations may also be performed for elements for which simulations were previously performed.

In some implementations, the simulation may simulate the beam from the receiving wireless power transfer device as originating at a subset of the elements of the receiving wireless power transfer device. The subset of the elements of the receiving wireless power transfer device from which the beam is simulated may be arranged in any suitable manner. For example, a receiving wireless power transfer device may include elements arranged in rectangular grid that is 20 elements tall by 10 elements wide. The simulation may simulate waveforms from a bottom 100 elements of the grid of elements. The wave front of the simulated beam experienced at the elements of the transmitting wireless power transfer device may be the product of the simulated waveforms from the bottom 100 elements. The wave front resulting from waveforms transmitted by the elements of the transmitting wireless power transfer device based on the experience of the wave front of the simulated beam may have a coherent phase over the 100 elements of the receiving wireless power transfer device for which waveforms were simulated, and may have less phase coherence over the 100 elements for which waveforms were not simulated. Subsequent simulations may be performed to simulate waveforms for the 100 elements of the receiving wireless power transfer device for which waveforms were not previously simulated. The elements of the transmitting wireless power transfer device may experience, in simulation, the wave front of the simulated beam resulting from the simulated waveforms originating at the 100 elements of the receiving wireless power transfer device for which waveforms were not previously simulated. The phase of the wave front of the simulated beam experienced by an element of the transmitting wireless power transfer device may be added to the phase of the previously simulated wave front experienced by the element. This may update the phase of the wave front of the simulated beam as experienced at the element to account for all of the elements of the receiving wireless power transfer device for which waveforms have been simulated, even when they were simulated during different update cycles. This may result in the wave front of the beam from the transmitting wireless power transfer device having coherent phase over the 200 elements of the receiving wireless power transfer device.

In some implementations, the beam may be simulated with waveforms originating at points on the receiving wireless power transfer device that do not correspond to the location of elements. The waveforms may be simulated from any suitable number of points. For example, a waveform may be simulated as originating from the center of mass of the receiving wireless power transfer device, forming the beam. The waveforms may be simulated as originating from points located in between elements of the receiving wireless power transfer device. For example, if the elements are arranged in a grid, the waveforms may be simulated as originating from points on the grid where the corners of four elements meet, forming the beam. The simulated waveforms may be simulated as originating from any suitable number of points at any suitable locations on the receiving wireless power transfer device. In some implementations, a first simulation may simulate waveforms originating from a point or points on the receiving wireless power transfer device, and simulations on subsequent update cycles may simulate waveforms originating from elements of the receiving wireless power transfer device.

Simulating the wave front as originating at a subset of elements of, or from a point or points on, the receiving wireless power transfer device may allow for the simulation to be completed more quickly, using fewer computational resources. This may result in the transmission of power to the receiving wireless power transfer device commencing sooner than it would have had waveforms been simulated for all of the elements of the receiving wireless power transfer device, or at a larger number of points, although the efficiency of the power transfer may be lower. To compensate for lower efficiency while waveforms have not yet been simulated from all of the elements of the receiving wireless power transfer device, the transmitting wireless power transfer device may transmit using more elements, and may also transmit at a higher amplitude. As waveforms are simulated from more of the elements, or from more points, of the receiving wireless power transfer device, the beam transmitted by the transmitting wireless power transfer device may increase in phase coherence across the elements of the receiving wireless power transfer device. This may increase the efficiency of the power transfer, allowing the transmitting wireless power transfer device to transmit using fewer elements and to reduce the amplitude of the elements being used.

For example, before beginning to transmit power to a receiving wireless power transfer device, a waveform originating from the center of mass of the receiving wireless power transfer device may be simulated. The experience, in simulation, by the elements of the transmitting wireless power transfer device of the wave front of the simulated beam constituted by the simulated waveform may be determined. The experienced phases may be used to determine the phases used by the elements of the transmitting wireless power transfer device as they begin transmitting, transferring power to the receiving wireless power transfer device. As the simulation only used the center of mass of the receiving wireless power transfer device, the beam from the transmitting wireless power transfer device may be focused on the center of mass of the receiving wireless power transfer device. This may result in the elements of the receiving wireless power transfer device experiencing the wave front of the beam with varying phases, resulting in less efficient power transfer. During subsequent update cycles, waveforms may be simulated from additional points on, or from elements of, the receiving wireless power transfer device. This may result in updates to the phases used by the elements of the transmitting wireless power transfer device. As additional waveforms are simulated from additional points or elements, the wave front of the beam transmitted by the transmitting wireless power transfer device may increase in phase coherence across the elements of the receiving wireless power transfer device, resulting in an increase in the efficiency of the power transfer.

Simulations of waveforms from elements of the receiving wireless power transfer device, or other points of the receiving wireless power transfer device, may be performed in any suitable order, for any groupings of elements and points over any number of intervals or update cycles. For example, half of the elements of a receiving wireless power transfer device may have waveforms simulated in a first cycle, and half of the remaining elements may have waveforms simulated in each subsequent update cycle, such that fewer elements have waveforms simulated in each update cycle until all elements have had waveforms simulated. Elements or points for which waveforms were simulated in a previous update cycle may have waveforms simulated in a subsequent update cycle, for example, to account for a change in relative position between the transmitting and receiving wireless power transfer devices.

In some implementations, instead of a first simulation, the elements of the transmitting wireless power transfer device may begin transmitting using phases based on an approximation derived from pre-computed tables or phase patterns which may be defined through analytic approximations that may describe the qualitative evolution of the focusing profile, including the phases to be used by the elements of the transmitting wireless power transfer device, through different angles and distances. This may allow the elements of the transmitting wireless power transfer device to quickly begin transmitting with a focus on the receiving wireless power transfer device. To offset any inefficiencies in the power transfer due to the use of an approximation to determine the phases used by the elements of the transmitting wireless power transfer device, more elements may be used, and the elements may transmit at higher amplitudes. Subsequent update cycles may simulate waveforms from elements of or points on the receiving wireless power transfer device, resulting in updates to the phases used by the elements of the transmitting wireless power transfer device. This may result in increased phase coherence of the wave front across the elements of the receiving wireless power transfer device. The transmitting wireless power transfer device may be able to transmit power using fewer elements, at lower amplitudes, as the efficiency of the power transfer increases. The amplitude of the waveforms transmitted from the elements of the transmitting wireless power transfer device may be based on the approximation used in lieu of the first simulation, and may be updated as simulations are performed.

In some implementations, instead of simulating a wave front that has a coherent phase, or flat phase, at its origin at the receiving wireless power transfer device, a wave front with a defined phase pattern may be simulated. This may allow for optimization of the waveforms, and resulting wave front, transmitted by the transmitting wireless power transfer device for specific groupings of elements on the receiving wireless power transfer device or for time uniformity of the rectification used by the receiving wireless power transfer device to rectify the electric current generated by its elements based on the transferred power. For example, two subsets of elements of the receiving wireless power transfer device, covering two separate areas, may have their simulated waveforms 90 degrees out-of-phase. This may result in the beam from the transmitting wireless power transfer device, transmitted based on the simulated waveforms, being 90 degrees out-of-phase across the two subsets of elements of the receiving wireless power transfer device. For example, the second subset of elements of the receiving wireless power transfer device may experience the wave front of the beam from the transmitting wireless power transfer device with a phase 90 degrees behind the first subset of elements. This may allow the receiving wireless power transfer device to keep power in its rectification through nulls in the wave front experienced by the first subset of elements and the second subset of elements, as one of the subsets of elements will be generating current from the power transferred by the wave front while the other is in a null due to the phase difference. The elements of the receiving wireless power transfer device may be divided into any number of subsets, with any number of phase differences of any suitable size between the subsets. This may allow drops in the rectified electrical signal to be smoothed out through the different phases the wave front of the beam from the transmitting wireless power transfer device presents to the subsets of elements of the receiving wireless power transfer device.

In some implementations, the phases and amplitudes to be transmitted by the elements of the transmitting wireless power transfer device may be determined by analyzing spatial frequencies of a wave front of a beam originating at the receiving wireless power transfer device using Fourier transforms. The analysis may determine the phases and amplitudes of a diffraction field at any coplanar offset from the receiving wireless power transfer device, such as, for example, at the location of the elements of the transmitting wireless power transfer device. An estimate of the angular misalign of the planes of the receiving wireless power transfer device and the transmitting wireless power transfer device may be incorporated into the analysis through small angle projections if the planes are not parallel.

The receiving wireless power transfer device may be treated as a diffracting aperture projecting onto the plane of the transmitting wireless power transfer device. The resulting diffraction pattern may define the phases and amplitudes that would be observed or experienced in the plane of the transmitting wireless power transfer device, including at the elements of the transmitting wireless power transfer device, as a phase/amplitude map. The positions on the plane that correspond to the elements of the transmitting wireless power transfer device may be sampled from the diffraction pattern, or phase/amplitude map, as determined using Fourier transforms. The phase conjugate may be applied to the sampled parts of the diffraction pattern to determine a phase/amplitude map, or phase and amplitude profile, which may be used by the transmitting wireless power transfer device to determine the phases and amplitudes that may be used by the elements of the transmitting wireless power transfer device to generate a beam with a uniform phase and amplitude wave front at the elements of the receiving wireless power transfer device.

The amplitudes used by the elements of the transmitting wireless power transfer device may be renormalized to the maximum power point of the elements of the transmitting wireless power transfer device to optimize the total power being transmitted. A lower power point may also be chosen for renormalization. The total power transmitted from the transmitting wireless power transfer device may be divided over multiple receiving wireless power transfer devices. This may be accomplished through the complex addition of multiple diffraction patterns, or phase/amplitude maps, and normalization to the maximum power that can be accomplished by any single element of the transmitting wireless power transfer device.

A wave front of uniform amplitude and phase may be defined in the plane of an aperture of the receiving wireless power transfer device. The aperture may correspond to the area encompassed by all, or a subset of, the elements of the receiving wireless power transfer device. The pitch of samples taken on the plane of the aperture of the receiving wireless power transfer device may correspond with any of the element pitch on the transmitting wireless power transfer device, the element pitch on the receiving wireless power transfer device, the greatest common multiple of the pitch of the elements of the transmitting wireless power transfer device and receiving wireless power transfer device, and any convenient or suitable pitch that may be interpolated from and onto the elements of the aperture of the receiving wireless power transfer device and the elements of an aperture of the transmitting wireless power transfer device.

If the plane of the aperture of the receiving wireless power transfer device is not parallel to the plane of the aperture of the transmitting wireless power transfer device, phase corrections may be determined that may be applied to each element of the aperture of the receiving wireless power transfer device to make the aperture of the receiving wireless power transfer device quasi-parallel to the plane of the aperture of the transmitting wireless power transfer device. For example, a first-order approximation may be made that the apparent width of the aperture of the transmitting wireless power transfer device remains constant from the perspective of the plane ($P_2$) of the aperture of the receiving wireless power transfer device, for example, as a square aperture driven with equal amplitude across its face. If the receiving wireless power transfer device has a flat phase profile across its surface the resulting phase profile, as part of a phase/amplitude map, in the parallel plane, for example, the plane ($P_1$) of the aperture of the transmitting wireless power transfer device, may be calculated by normalizing the receiving wireless power transfer device's actual surface normal unit vector $\vec{n}_r$ to length $$|\vec{k}| = \frac{2\pi}{\lambda}$$

and taking it to be the central $\vec{k}$ of the emitted angular spectrum from the aperture of the receiving wireless power transfer device, where $\lambda$ is the wavelength of the plane wave associated with the vector $\vec{k}$, which may be normal to the plane wave. The phase profile of the phase/amplitude map at the plane $P_2$ may be approximately given by:

$$\phi_r(x,y) = e^{-i(k_{rx}x + k_{ry}y)} \quad (1)$$

where $$\vec{k}_r = \langle k_{rx}, k_{ry}, k_{rz} \rangle = |\vec{k}| \cdot \vec{n}_r \quad (2)$$

This may be a rotation of a true flat phase profile of the aperture of the receiving wireless power transfer device to give a notional emitted field, or wave front, represented by the phase/amplitude map $r_{xE}(x, y)$ a linear phase profile in the plane $P_2$ by multiplication by a complex exponential. This may be a shift of the angular spectrum in spatial frequency to be centered around $(v_{rx}, v_{ry}) = (k_{rx}, k_{ry})/2\pi$. Similarly, after $r_{xR}(x, y)$, which may be a phase/amplitude map for a physical field, or wave front, received at the elements of the aperture of the receiving wireless power transfer device, is calculated in the plane $P_2$, it may be rotated back into the plane of the aperture of the receiving wireless power transfer device by division by the same complex exponential.

A Fourier transform in the plane $P_2$ of the aperture of the receiving wireless power transfer device may be determined, resulting in a spatial frequency representation in the plane $P_2$. $r_{xE}(x, y)$ may be a phase/amplitude map for the notional field that would emitted from the aperture of the receiving wireless power transfer device, for example, based on the elements of the receiving wireless power transfer device transmitting waves, such as ultrasonic waves, with uniform phase and amplitude. A Fourier transform may be used to determine $R_{xE}(v_x, v_y)$, which may be the Fourier transform of $r_{xE}(x, y)$, and may be the spatial frequency representation in the plane $P_2$ of the notional field, or wave front, that would be emitted from the aperture of the receiving wireless power transfer device based on the phase/amplitude map $r_{xE}(x, y)$.

The notional field $r_{xE}$, with the phase/amplitude map $r_{xE}(x, y)$, may be propagated from the plane $P_2$ of the aperture of the receiving wireless power transfer device to the plane $P_1$ of the aperture of the transmitting wireless power transfer device in the spatial frequency domain. $t_{xR}(x, y)$ may be a phase/amplitude map for a notional field that would be received at the aperture of the transmitting wireless power transfer device based on $r_{xE}(x, y)$ being emitted from the aperture of the receiving wireless power transfer device. $t_{xR}(x, y)$ may be determined according to:

$$T_{xR}(v_x, v_y) = R_{xE}(v_x, v_y) H(v_x, v_y) \quad (3)$$

where $T_{xR}(v_x, v_y)$ is the Fourier Transform of $t_{xR}(x, y)$, and where:

$$H(v_x, v_y) = e^{jk_z d} \quad (4)$$

where $$j = \sqrt{-1}, k_z = 2\pi \sqrt{\frac{1}{\lambda^2} - v_x - v_y},$$

$\lambda$ is the wavelength of the plane wave associated with the vector $\vec{k}$, which may be normal to the plane wave, and d is the displacement on the z-axis between the plane $P_2$ and the plane $P_1$, where $\vec{k}(v_x, v_y) = \langle k_x, k_y, k_z \rangle$, with $v_x$ and $v_y$ being transverse spatial frequencies in the plane. Additionally, $k_x = 2\pi v_x$ and $k_y = 2\pi v_y$. The magnitude of the plane wave associated with the vector $$\vec{k} = k = \frac{2\pi}{\lambda}.$$

$T_{xR}(v_x, v_y) = R_{xE}(v_x, v_y) H(v_x, v_y)$ may be equivalent to $t_{xR}(x, y) = r_{xE}(x, y) * h(x, y)$, where the * operator may represent linear convolution. This may be used to determine any field in the plane z=d, or f(x, y, z=d)=g(x, y) based on the field in any plane f(x, y, z=0)=f(x, y) according to $G(v_x, v_y) = F(v_x, v_y) H(v_x, v_y)$ or g(x, y)=f(x, y)*h(x, y) where to $G(v_x, v_y)$ is a Fourier transform of g(x, y) and $F(v_x, v_y)$ is a Fourier transform of f(x, y).

$H(v_x, v_y)$ may be a transformation kernel, or spatial-frequency domain transfer function, that may define the Fourier transform of the point spread function for Fraunhofer diffraction at the orthonormal distance between the plane of the aperture of the transmitting wireless power transfer device and the center point of the aperture of the receiving wireless power transfer device.

$H(v_x, v_y)$ may be applied to the Fourier transform $R_{xE}(v_x, v_y)$, which may be the spatial frequency representation of the plane of the aperture of the receiving wireless power transfer device. An inverse Fourier transform may be applied to the result $T_{xR}(v_x, v_y)$, which may be the spatial frequency representation of the plane of the aperture of the transmitting wireless power transfer device, to produce $t_{xR}(x, y)$, which may be the phase/amplitude map of the plane of the aperture of the transmitting wireless power transfer device.

The spatial diffraction pattern, or phase/amplitude map, $t_{xR}(x, y)$ may be windowed to the aperture of the transmitting wireless power transfer device and a phase conjugate may be applied to the complex amplitude/phase signal to determine the phase/amplitude map that may reconstruct the notional field represented by the phase/amplitude map $r_{xE}(x, y)$ at the aperture of the receiving wireless power transfer device. Resampling of the phase/amplitude map $t_{xR}(x, y)$ may be necessary if the pitch of the constructed plane of the aperture of the receiving wireless power transfer device does not correspond to the element pitch of the transmitting wireless power transfer device.

For example, $t_{xE}(x, y)$ may be the phase/amplitude map of the physical field emitted by elements of the transmitting wireless power transfer device, for example, as an ultrasonic beam, intended to produce the desired complex field in the plane of the aperture of the receiving wireless power transfer device. $t_{xE}(x, y)$ may be determined in the spatial domain according to:

$$t_{xE}(x, y) = t_{xR}*(x, y) A_{tx}(x, y) \quad (5)$$

where $t_{xR}*(x, y)$ is the complex conjugate of $t_{xR}(x, y)$, and $A_{tx}(x, y)$ is the aperture of the transmitting wireless power transfer device, as only the portion of $t_{xR}(x, y)$ which overlaps the aperture of the transmitting wireless power transfer device may be physically phase-conjugated and re-radiated by the elements of the transmitting wireless power transfer device.

The magnitude of the phase/amplitude map $t_{xE}(x, y)$ may be normalized to optimize the desired power level transmitted from the transmitting wireless power transfer device. This may include maximizing the power transmitted by the transmitting wireless power transfer device, tuning to a particular desired power level, for example, as indicated by the receiving wireless power transfer device, and dividing the total available power of the transmitting wireless power transfer device over multiple receiving wireless power transfer devices. Apertures may be combined through linear superposition. Normalization and prediction of power delivered may be determined prior to or after the combination of apertures depending upon the result desired.

$r_{xR}(x, y)$ may be the phase/amplitude map of the physical field received in the plane of the aperture of the receiving wireless power transfer device, for example, as the wave front of an ultrasonic beam from the elements of the transmitting wireless power transfer device. When the transmitting wireless power transfer devices emits a physical field, such as the ultrasonic beam, based on the phase/amplitude map $t_{xE}(x, y)$, the field $r_{xR}(x, y)$ may be predicted by:

$$R_{xR}(v_x, v_y) = T_{xE}(v_x, v_y) H(v_x, v_y) \quad (6)$$

where $T_{xE}(v_x, v_y)$ is the Fourier transform of $t_{xE}(x, y)$ and $R_{xR}(v_x, v_y)$ is the Fourier transform of $r_{xR}(x, y)$.

Zero padding prior to the use of Fourier transformation may be used to allow the desired linear convolution to be extracted from the circular convolution implemented by multiplication in the discrete spatial frequency domain. This may result in a sampled region that is larger than the face of the array of elements of the transmitting wireless power transfer device. When the diffraction pattern is located near the center of the array of elements of the transmitting wireless power transfer device, less zero padding may be used. For example, when the transmitting wireless power transfer device includes an array of elements that is 160 elements x 160 elements, zero padding may be used to create a sample space that may be 1024 elements x 1024 elements. When the portion of interest of the diffraction pattern lies farther from the center of the array of elements of the transmitting wireless power transfer device, for example, due to the plane of the aperture of the receiving wireless power transfer device being at a steep angle to the plane of the aperture of the transmitting wireless power transfer device, more zero padding may be used.

The power coupling efficiency η between the notional field emitted by the receiving wireless power transfer device, $r_{xE}$, and the physical field received by the receiving wireless power transfer device, $r_{xR}$, may be evaluated by an overlap integral over an infinite plane in space according to:

$$\eta(r_{xE}, r_{xR}) = \frac{\left|\int r_{xE}^* r_{xR} dA\right|^2}{\int |r_{xE}|^2 dA \int |r_{xR}|^2 dA} \quad (7)$$

Since $r_{xE}$ may have a value of 0 at any location in space that is not part of the aperture of the receiving wireless power transfer device, the integral may be evaluated over the area of the aperture of the receiving wireless power transfer device. Because the physical field $t_{xE}$ and the notional field $t_{xR}$ may be free space propagations of the notional field $r_{xE}$ and the physical field $r_{xR}$, power coupling efficiency may be determined immediately in the plane of the aperture of the transmitting wireless power transfer device, as $\eta(r_{xE}, r_{xR}) = \eta(t_{xE}, t_{xR})$, where the areas of integration are the areas of the apertures of the transmitting and receiving wireless power transfer devices.

Optimal power transfer between the transmitting wireless power transfer device and the receiving wireless power transfer device may occur when the field emitted from the transmitting wireless power transfer device is the phase conjugate of the complete diffraction pattern produced on the plane of the transmitting wireless power transfer device by the notional field with the flat phase/amplitude map emitted notionally by the receiving wireless power transfer device. When the entire phase conjugate diffraction pattern cannot be generated, only the portion of the generated field that overlaps with the diffraction pattern may enter the mode of the receiving wireless power transfer device. If the majority of the diffraction pattern intensity produced on the plane of the transmitting wireless power transfer device by the flat phase/amplitude map at the receiving wireless power transfer device does not land within the aperture of the transmitting wireless power transfer device, power may not be efficiently coupled in either direction. An optimum phase/amplitude map may maximize the fraction of energy in the diffraction pattern of the receiving wireless power transfer device that lands within the aperture of the transmitting wireless power transfer device.

The receiving wireless power transfer device may provide feedback to the transmitting wireless power transfer device. The feedback may be provided using any suitable form of communication. For example, the communication may be in-band, using the elements of the receiving wireless power transfer device to transmit data to the elements of the transmitting wireless power transfer device, or out-of-band, using, for example, Bluetooth, Wi-Fi or cellular communications, or any other suitable form of wireless or wired communication. The feedback from the receiving wireless power transfer device may indicate the phase and amplitude of the wave front of the beam formed by the waveforms from the elements of the transmitting wireless power transfer device as measured at the elements of the receiving wireless power transfer device. The transmitting wireless power transfer device may use the feedback to adjust the phases and amplitudes used by its elements, for example, to reduce any unintentional phase incoherence across the elements of the receiving wireless power transfer device as indicated by the feedback. The feedback may also indicate to the transmitting wireless power transfer device that the receiving wireless power transfer device requires less power, for example, due to a battery being charged to some threshold level. The transmitting wireless power transfer device may change the phase and amplitude used by its elements, and the number of elements used, so that the transferred power can be used to trickle charge the battery of the receiving wireless power transfer device. The phases and amplitudes used may be chosen for efficiency, rather than for maximum power transfer or for maintaining a coherent phase wave front across the elements of the receiving wireless power transfer device.

FIG. 1 shows an example system suitable for beamforming for wireless power transfer according to an implementation of the disclosed subject matter. A transmitting wireless power transfer device 100 may include elements 111, 112, 113, 114, 115, 116, 117, 118, and 119, which may be capable of transmitting and receiving wireless power. The transmitting wireless power transfer device 100 may be a device for transmitting wireless power, which may draw power from a source of energy such as a power outlet connected to any suitable power source, a battery, or any other source of energy, and may be designed to provide power to other electronic or electric devices. The elements 111, 112, 113, 114, 115, 116, 117, 118, and 119 may be, for example, ultrasonic transducer elements, RF transducer elements, optical transducer elements, or any other element type suitable for the transmission of wireless power. The elements 111, 112, 113, 114, 115, 116, 117, 118, and 119 may be capable of operating in both a transmitting and receiving mode. In a transmitting mode, the elements 111, 112, 113, 114, 115, 116, 117, 118, and 119 may generate waveforms, for example, ultrasonic sound waves, RF waves, or light waves, which may carry energy to a receiving wireless power transfer device 150. In a receiving mode, the elements 111, 112, 113, 114, 115, 116, 117, 118, and 119 may react to receiving waveforms, for example, ultrasonic sound waves, RF waves, or light waves generated elsewhere by converting the waveforms into electrical signals. For example, an ultrasonic transducer may use a piezoelectric flexure which may vibrate at ultrasonic frequencies when an appropriate electrical signal is supplied, generating an ultrasonic sound wave, and may be vibrated at ultrasonic frequencies when receiving an ultrasonic sound wave, generating an electrical signal. In some implementations, the elements 111, 112, 113, 114, 115, 116, 117, 118, and 119 may be optimized for the transmitting of wireless power.

A receiving wireless power transfer device 150 may include elements 151, 152, 153, 154, 155, 156, 157, 158, and 159, which may be capable of receiving and transmitting wireless power. The receiving wireless power transfer device 150 may be a component of, or connected to, an electronic or electric device to which the receiving wireless power transfer device 150 may supply power. For example, the receiving wireless power transfer device 150 may be part of a smartphone, and may supply electricity to the smartphone's battery. The elements 151, 152, 153, 154, 155, 156, 157, 158, and 159 may be, for example, ultrasonic transducer elements, RF transducer elements, optical transducer elements, or any other element type suitable for the transmission of wireless power. The elements 151, 152, 153, 154, 155, 156, 157, 158, and 159 may be of the same type, or of a similar type with optimizations for the specific role of the element, as the elements 111, 112, 113, 114, 115, 116, 117, 118, and 119, in order to allow the transfer of wireless power between the transmitting wireless power transfer device 100 and the receiving wireless power transfer device 150. For example, an element of the wireless power transfer device 100 may be optimized for power transmission, while an element of the receiving wireless power transfer device 150 may be optimized for power receiving.

The elements 111, 112, 113, 114, 115, 116, 117, 118, and 119 may generate waveforms, for example, based on received electrical signals. The waveforms may form a beam 180, carrying energy to the receiving wireless power transfer device 150. The beam 180 may be, for example, a beam of ultrasonic sound waves, RF waves, or light. A wave front of the beam 180 may arrive at the elements 151, 152, 153, 154, 155, 156, 157, 158, and 159, resulting in the generation of electricity by the receiving wireless power transfer device 150 from the energy carried by the beam 180. The efficiency with which the receiving wireless power transfer device 150 generates electricity from the beam 180 may depend on, for example, whether the beam 180 is directed at the receiving wireless power transfer device 150, how focused the beam is on the receiving wireless power transfer device 150, and the phase coherence of the wave front of the beam 180 across the elements 151, 152, 153, 154, 155, 156, 157, 158, and 159. The transmitting wireless power transfer device 100 may control the steering and focus of the beam 180 and the phase of the wave front across the elements 151, 152, 153, 154, 155, 156, 157, 158, and 159 by controlling the phases of the waveforms transmitted by the elements 111, 112, 113, 114, 115, 116, 117, 118, and 119.

In some implementations, the elements 111, 112, 113, 114, 115, 116, 117, 118, and 119 of the transmitting wireless power transfer device 100 and the elements 151, 152, 153, 154, 155, 156, 157, 158, and 159 may be used for in-band communication. For example, the transmitting wireless power transfer device 100 and the receiving wireless power transfer device 150 may communicate using the waveforms generated by their respective elements. The transmitting wireless power transfer device 100 and receiving wireless power transfer device 150 may also communicate out-of-band, for example, using a Bluetooth, Wi-Fi, cellular, or other suitable wireless connection, or a suitable wired connection.

Figure 2:
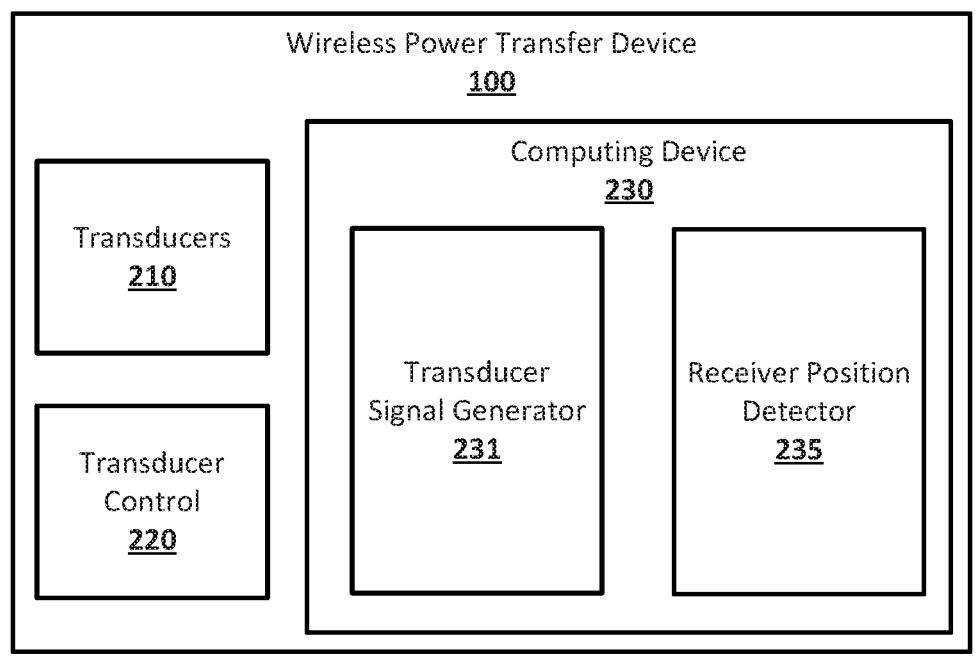
FIG. 2 shows an example system suitable for beamforming for wireless power transfer according to an implementation of the disclosed subject matter.

FIG. 2 shows an example system suitable for beamforming for wireless power transfer according to an implementation of the disclosed subject matter. The transmitting wireless power transfer device 100 may include transducers 210, transducer control 220, and a computing device 230, which may include a transducer signal generator 231 and receiver position detector 235. The transducers 210 may be any suitable transducers for the transmission of wireless power, such as, for example, the elements 111, 112, 113, 114, 115, 116, 117, 118, and 119. The transducer control 220 may be any suitable combination of hardware and software for controlling the transducers 210, for example, based on control signals from the transducer signal generator 231. The computing device 230 may be any suitable computing device, such as, for example, a computer 20 as described in FIG. 18, or component thereof, for implementing the transducer signal generator 231 and the receiver position detector 235. The computing device 230 may be a single computing device, or may include multiple connected computing devices, and may be, for example, a laptop, a desktop, an individual server, a server farm, or a distributed server system, or may be a virtual computing device or system. The computing device 230 may be part of a computing system and network infrastructure, or may be otherwise connected to the computing system and network infrastructure. The transducer signal generator 231 may be any suitable combination of hardware and software on the computing device 130 for generating control signals that may be used to control the transducers 210. The receiver position detector 235 may be any suitable combination of hardware and software for detecting the position of a receiving wireless power transfer device, such as the receiving wireless power transfer device 150.

The transducers 210 may be any suitable transducers for the transmission of wireless power, such as, for example, the elements 111, 112, 113, 114, 115, 116, 117, 118, and 119. The transducers 210 may be, for example, ultrasonic transducers, RF transducers, or optical transducers. The transmitting wireless power transfer device 100 may include any suitable number of transducers 210, arranged in any suitable manner. For example, the transducers 210 may all be arranged in grid pattern on the same plane, may be arranged across multiple planes at various angles, or may be arranged on curved or spherical surfaces of the transmitting wireless power transfer device 100. The transducers 210 may operate in receiving mode or a transmitting mode. In some implementations, the transducers 210 may operate in both modes at the same time, for example, with certain transducers operating in a receiving mode while others operate in a transmitting mode.

The transducer control 220 may be any suitable combination of hardware and software for controlling the transducers 210, for example, based on control signals from the transducer signal generator 231. The transducer control 220 may include any suitable electronics, including general purpose or specialized processors and controllers, circuitry, and electrical connections to connect the computing device 230 to the transducers 210. The transducer control 220 may also include any suitable electronics, including general purpose or specialized processors and controllers, circuitry, and electrical connections to handle electrical signals generated by any of the transducers 210 operating in a receiving mode. For example, the transducer control 220 may include voltage rectifiers and transformers to convert an electrical signal generated based on received power to a specified current type and voltage, and to direct the electrical signal to an appropriate form of energy storage. The transducer control 220 may also, in conjunction with the computing device 230, interpret in-band communications received at the transducers 210. The transducer control 210 may be able to determine the phase and amplitude of a wave front as experienced at any of the transducers 210 when operating in a receiving mode. The phase determination may be made relative to other transducers 210 which may receive the same wave front, and may be made using any suitable measurements taken over any suitable period of time at any suitable intervals.

The computing device 230 may be a single computing device, or may include multiple connected computing devices, and may be, for example, a laptop, a desktop, an individual server, a server farm, or a distributed server system, or may be a virtual computing device or system. The computing device 230 may be part of a computing system and network infrastructure, or may be otherwise connected to the computing system and network infrastructure. The computing device 230 may be part of the same physical device as the transducers 210, or may be part of a separate device connected to the transducer 210 through the transducers control 220 through, for example, a wired or wireless connection.

The transducer signal generator 231 may be any suitable combination of hardware and software on the computing device 130 for generating control signals that may be used to control the transducers 210. The transducer signal generator 231 may generate control signals which may be used to control the waveforms generated by the transducers 210. Control signals generated by the transducer signal generator 231 may, for example, indicate the phase, frequency, and amplitude of the waveforms to be generated by the transducers 210. The transducer signal generator 231 may use phases and amplitudes of a received wave front, as determined at the transducers 210, to generate control signals, for example, using the phase differences as determined at the transducers 210. The transducer signal generator 231 may determine when the transducers 210 enter receiving and transmitting modes.

The receiver position detector 235 may be any suitable combination of hardware and software for detecting the position of a receiving wireless power transfer device, such as the receiving wireless power transfer device 150. The position of the receiving wireless power transfer device 150, which may be an intended target of wireless power from the transmitting wireless power transfer device 100, may include the distance from the transmitting wireless power transfer device 100, angles of a vector between the transmitting wireless power transfer device 100 and receiving wireless power transfer device 150, and angle of orientation of the receiving wireless power transfer device 150, including the orientation of any transducers, for example, the elements 151, 152, 153, 154, 155, 156, 157, 158, and 159, of the receiving wireless power transfer device 100. For example, the receiver position detector 235 may receive position data from the receiver wireless power transfer device 150, including, for example, gyroscope and accelerometer data. The receiver position detector 235 may use the transducers 210 to locate the receiving wireless power transfer device 150, for example, transmitting the beam 180, with, for example, a narrow focus, at various angles until the receiving wireless power transfer device 150 responds that it detected the beam 180. The receiver position detector 235 may also use any other separate tracking or range-finding devices to locate the position of the receiving wireless power transfer device 150.

Figure 3A:
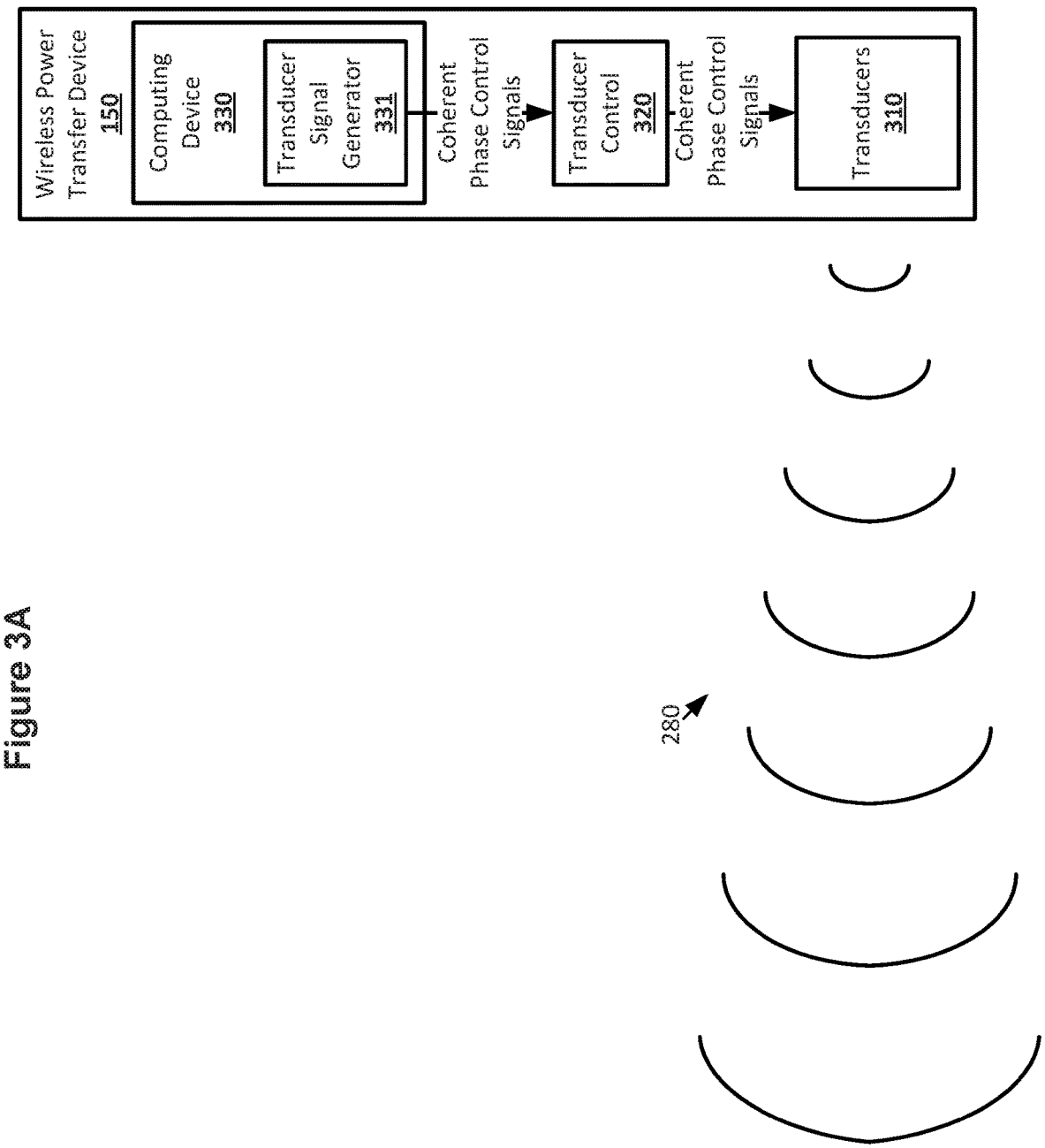
FIGS. 3A and 3B show example arrangements suitable for beamforming for wireless power transfer according to an implementation of the disclosed subject matter.

FIG. 3A shows an example arrangement suitable for beamforming for wireless power transfer according to an implementation of the disclosed subject matter. The receiving wireless power transfer device 150 may include transducers 310, which may include, for example, the elements 151, 152, 153, 154, 155, 156, 157, 158, and 159. A transducer signal generator 331 of a computing device 330 of the receiving wireless power transfer device 150 may generate control signals for the generation of a coherent phase beam by the transducers 310. The coherent phase control signals may be sent to a transducer control 320, which may control the transducers 310 to generate a beam 280. The beam 280 may have a coherent phase at its origin across the transducers 310. For example, the waveforms generated by the elements 151, 152, 153, 154, 155, 156, 157, 158, and 159 may all be in phase. The wave front of the beam 280 may propagate away from the transducers 310. The receiving wireless power transfer device 150 may transmit the beam 280 for any suitable length of time. For example, the receiving wireless power transfer device 150 may transmit the beam 280 for a short duration, to conserve power, or until an out-of-band confirmation that the beam 280 was detected is received from the transmitting wireless power transfer device 100. In some implementations, the beam 280 may be transmitted by the transducers 310 using a defined phase pattern. For example, the elements 151, 152, and 153 may transmit in phase with each other, the elements 154, 155, and 156 may transmit in phase with each other and out-of-phase with the elements 151, 152, and 153 by 45 degrees, and the elements 157, 158, and 159 may transmit in phase with each other and out-of-phase with the elements 151, 152, and 153 by 90 degrees.

The transducers 210 may be operating in a receiving mode. For example, the receiving wireless power transfer device 150 may indicate through out-of-band communications with the transmitting wireless power transfer device 100 that it intends to transmit the beam 280, or the transducers 210 may enter a receiving mode at specified intervals. The transducers 210 may detect the beam 280. For example, the wave front of the beam 280 may arrive at the elements 111, 112, 113, 114, 115, 116, 117, 118, and 119. The transducer control 220 may receive the electrical signals generated by the transducers 210 from the energy carried by the beam 280, and may determine properties of the wave front of the beam 280 at the transducers 210. For example, the transducer control 220 may determine the phase and amplitude of the wave front as experienced at each transducer, or element, of the transducers 210. The determined properties of the wave front of the beam 280 as experienced at the transducers 210 may be sent to the transducer signal generator 231. In some implementations, the transducer control 220 may pass the electrical signals as received from the transducers 210 to the transducer signal generator 231, which may analyze the electrical signals to determine the properties of the wave front of the beam 280 as experienced at the transducers 210.

The phase determinations may be relative to any one of the transducers 210. For example, the transducer which first detects the wave front of the beam 280 may be considered to have experienced a phase of 0 degrees and the phases of the rest of the transducers 210 may be determined relative to this transducer. When the beam 280 is a continuous wave, the phase determined for any transducer may be between 0 and 359 degrees, as a phase of 360 degrees may be equivalent to a phase of 0 degrees. The phase determination may occur over any suitable number of cycles of the wave front. In some implementations, the beam 280 may be pulsed, which may result in full phase differences being detected, starting at 0 degrees and with no upper limit, as a 360 degree difference between the phases of two transducers may not indicate that the two transducers are in phase when the beam 280 is pulsed. For example, when the beam 280 is pulsed, two transducers may have a phase difference greater than 360 degrees.

Figure 3B:
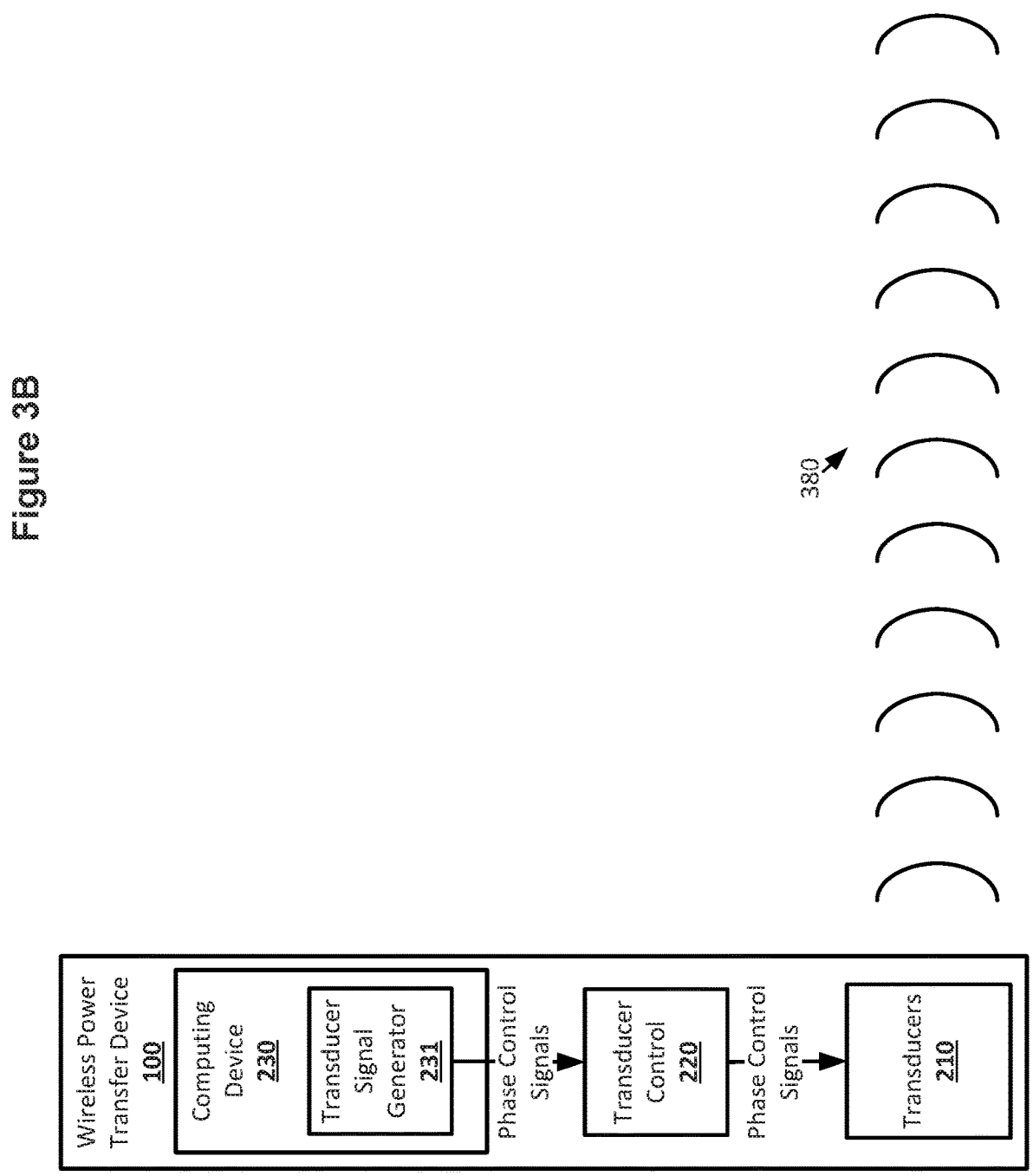

FIG. 3B shows an example arrangement suitable for beamforming for wireless power transfer according to an implementation of the disclosed subject matter. The transducer signal generator 231 of the transmitting wireless power transfer device 100 may generate control signals for the generation of a beam by the transducers 210 that may be directed at the receiving wireless power transfer device 150 based on the phases of the wave front of the beam 280 as experienced by the transducers 210. For example, the transducer signal generator 231 generate a control signal that may cause the transducers 210 to transmit waveforms with the same phase difference experienced by the transducers 210. The phase control signals may be sent to the transducer control 220, which may control the transducers 210 to generate a beam 380. The beam 380 may have a coherent phase across the transducers 310. For example, the waveforms generated by the elements 111, 112, 113, 114, 115, 116, 117, 118, and 119 may have various phases, depending on the phase of the wave front of the beam 280 that was experienced by each element. The waveforms from the transducers 210 may be phase shifted from the phases experienced by the transducers 210 as long as the experienced phase differences are maintained. The wave front of the beam 380 may be directed towards, and have a coherent phase across, the elements 151, 152, 153, 154, 155, 156, 157, 158, and 159, such that each element ideally experiences the wave front with the same phase as the other elements. The wave front of the beam 380 may propagate away from the transducers 210 towards the transducers 310.

The transducers 310 may be operating in a receiving mode. For example, the receiving wireless power transfer device 150 may receive an indication through out-of-band communications with the transmitting wireless power transfer device 100 that it intends to transmit the beam 380, or the transducers 310 may enter a receiving mode at specified intervals, for example, after ceasing transmission of the beam 280. The transducers 310 may detect the beam 380. For example, the wave front of the beam 380 may arrive at the elements 151, 152, 153, 154, 155, 156, 157, 158, and 159. The transducer control 320 may receive the electrical signals generated by the transducers 310 from the energy carried by the beam 380, and may supply this energy to an energy storage device 340, which may be, for example, a battery, a capacitor, or any other suitable form of storage for the electrical energy generated by the transducers 310. The transducers 310, transducer control 320, and energy storage device 340 may include appropriate electronics, circuitry, and connections to store electrical energy, including, for example rectifiers and transformers for converting the electrical signals from the transducers 310 to a suitable current type and voltage.

Figure 4B:
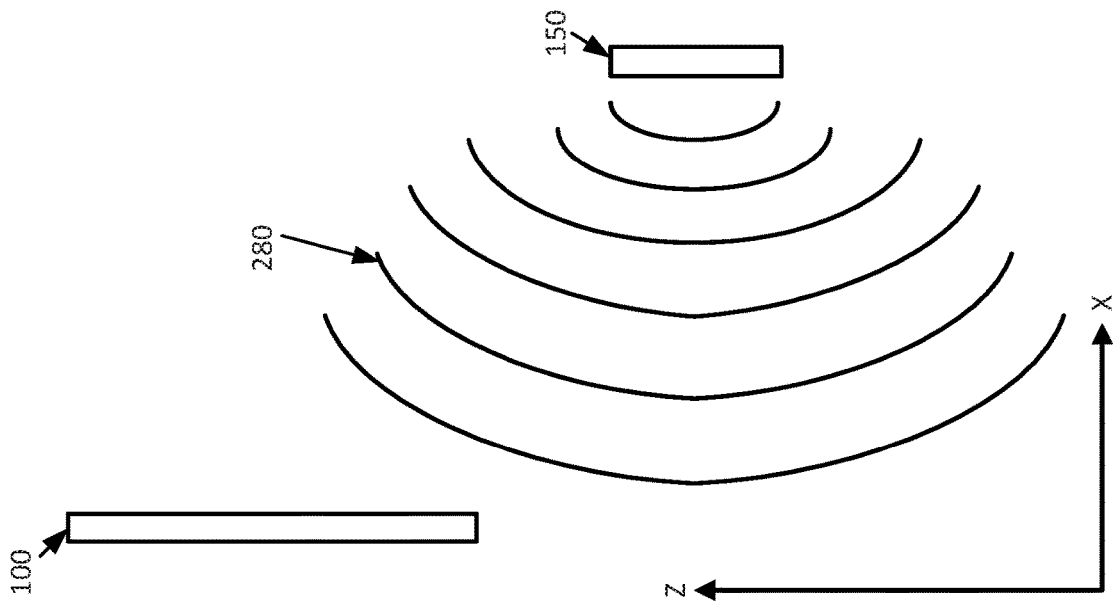
FIGS. 4A and 4B show example arrangements suitable for beamforming for wireless power transfer according to an implementation of the disclosed subject matter.
Figure 4A:
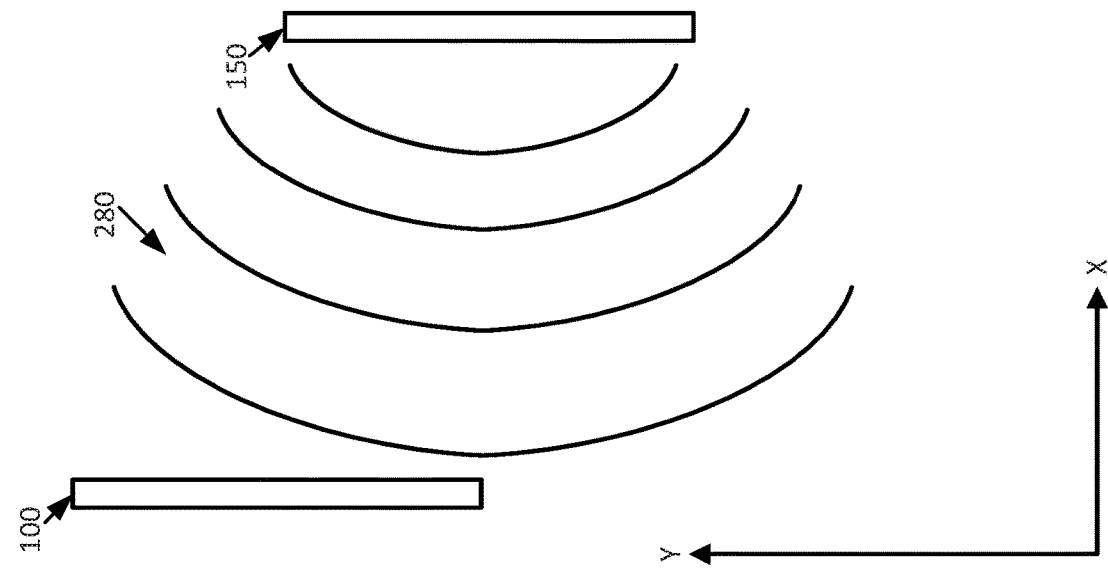

FIGS. 4A and 4B show example arrangements suitable for beamforming for wireless power transfer according to an implementation of the disclosed subject matter. The beam 280 transmitted by the receiving wireless power transfer device 150 may not be aimed at the transmitting wireless power transfer device 100. The beam 280 may be the result of the transducers 310 transmitting waveforms that are in phase. The direction of the beam 280 may depend on the relative locations of the transducers 310 on the receiving wireless power transfer device 150. For example, if the transducers 310 are located in a grid on a flat plane, the beam 280 may propagate outward from the flat plane. As long as the transducers 310 are facing the transducers 210, the wave front of the beam 280 may arrive at the transducers 210, although some part of the wave front may propagate out into space and miss the transducers 310. The transducers 210 may detect variations in phase of the wave front, depending on the positions of the transducers 210 relative to the positions of the transducers 310. For example, with the receiving wireless power transfer device 150 located lower than and to the left of the transmitting wireless power transfer device 100, the wave front of the beam 280 may first arrive at transducers that are located lower on and on the left side of, when facing towards the transducers, the transmitting wireless power transfer device 100. Transducers located higher on, or to the right of, the transmitting wireless power transfer device 100 may receive the wave front of the beam 280 later, resulting in a phase difference in the transducers' experience of the wave front. Phase differences may also be introduced due to interference between the constituent waveforms of the beam 280. When the beam 280 is a continuous wave, the phase difference between the phases experienced by any two of the transducers 210 may be no greater than 359 degrees, as two transducers which experience a phase difference of 360 degrees, or one wavelength, may be in phase. In some implementations, the beam 280 may be pulsed, which may result in full phase differences being detected, as two transducers with a phase difference of 360 degrees may not be in phase when the beam 280 is pulsed.

FIG. 5 shows example waveforms suitable for beamforming for wireless power transfer according to an implementation of the disclosed subject matter. Graph 511 may represent the wave front of the beam 280 as experienced at a first of the transducers 210. Graph 512 may represent the wave front of the beam 280 as experienced at a second of the transducers 210. Graph 513 may represent the wave front of the beam 280 as experienced at a third of the transducers 210. The beam 280 may be continuous, or may be pulsed with the graphs 511, 512, and 513 representing, for example, the experience of the wave front of a pulse at the transducers. The first of the transducers 210 may be the first transducer at which the wave front of the beam 280 arrives, and may be assigned a phase of 0 for the waveform 512. The second of the transducers 210 may experience the wave front of the beam 280 with a phase difference 520 from the first of the transducers 210, resulting in the waveform 521. The phase difference 520 may be, for example, 50 degrees. The phase difference may be equal to the number of degrees through a full wavelength the wave front cycles through at the first of the transducers 210 before the wave front arrives at the second of the transducers 210, or may be a phase difference resulting from, for example, interference in the wave front after the wave front has arrived at both the first and second transducers. The interference may be based on how close to the center or focus of the beam 280 the second of the transducers 210 is located. The third of the transducers 210 may experience the wave front of the beam 280 with a phase difference 530 from the first of the transducers 210, resulting in the waveform 513. The phase difference 520 may be, for example, 180 degrees. When receiving the beam 280, any transducer of the transducers 210 may be chosen as the transducer experiencing the wave front of the beam 280 with a phase of 0, and the phases experienced by all other transducers may be determined relative to the chosen transducer.

FIG. 6 shows example waveforms suitable for beamforming for wireless power transfer according to an implementation of the disclosed subject matter. Graph 611 may represent a waveform for the beam 380 as transmitted at a first of the transducers 210. Graph 612 may represent a waveform for the beam 380 as transmitted at a second of the transducers 210. Graph 613 may represent a waveform for the beam 380 as transmitted at a third of the transducers 210. The beam 380 may be continuous, or may be pulsed with the graphs 611, 612, and 613 representing, for example, the transmission of the wave front of a pulse from the transducers. The first of the transducers 210 may transmit a waveform 621 that may be same as the waveform 521. The second of the transducers 210 may transmit a waveform 622 that may be the same as the waveform 522. The waveform 622 may be out-of-phase with the waveform 621 by the same phase difference that the waveform 522 was out-of-phase with the waveform 521, for example, the phase difference 520 of 50 degrees. The third of the transducers 210 may transmit a waveform 623 that may be the same as the waveform 523. The waveform 623 may be out-of-phase with the waveform 621 by the same phase difference that the waveform 523 was out-of-phase with the waveform 521, for example, the phase difference 530 of 180 degrees. The phase differences between the waveforms 521, 522, and 523 may be maintained by the waveforms 621, 622, and 623.

Figure 7B:
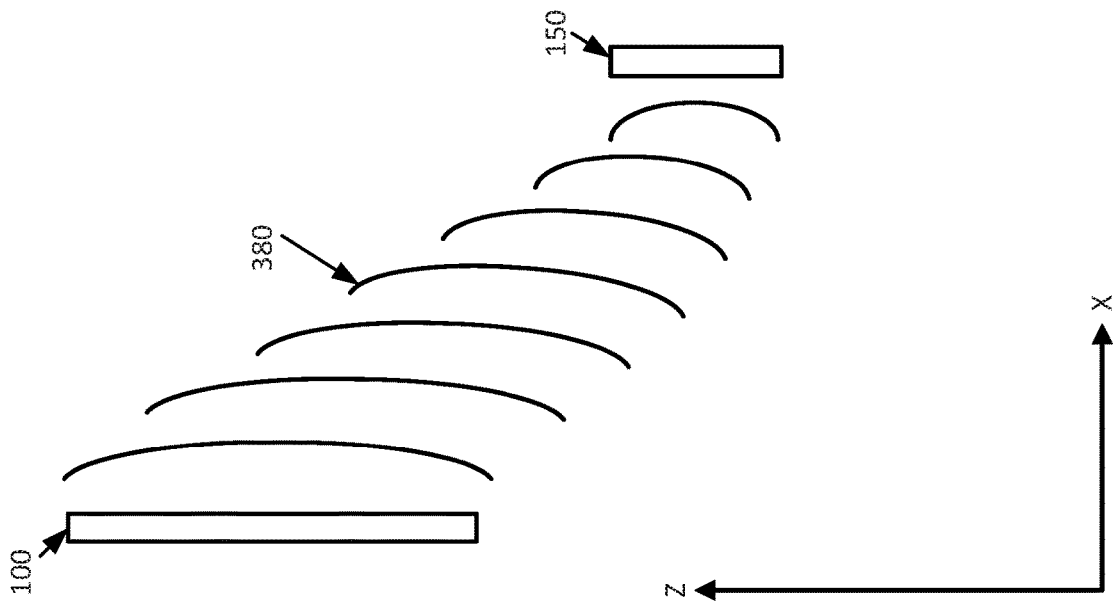
FIGS. 7A and 7B show example arrangements suitable for beamforming for wireless power transfer according to an implementation of the disclosed subject matter.
Figure 7A:
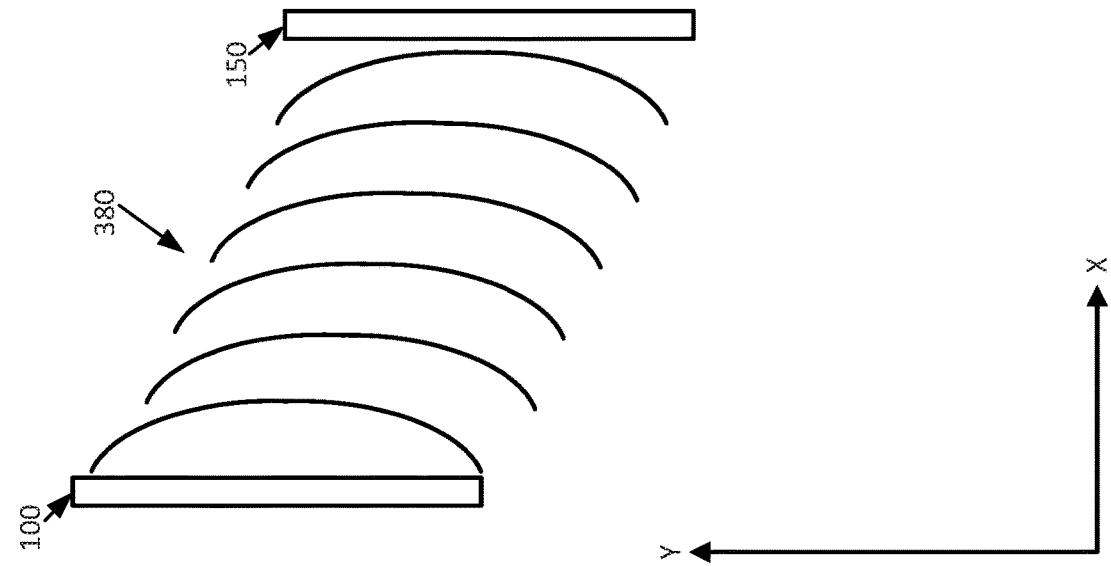

FIGS. 7A and 7B show example arrangements suitable for beamforming for wireless power transfer according to an implementation of the disclosed subject matter. The beam 280 transmitted by the transmitting wireless power transfer device 100 may be aimed at the receiving wireless power transfer device 150. The beam 380 may be the result of the transducers 210 transmitting waveforms that maintain the phase difference from each transducers' experience of the wave front of the beam 280. The direction of the beam 380 may be the result of interference among the constituent waveforms of the beam 380, resulting in recreation of the portion of the beam 280 that arrived at the transducers 210. Destructive interference due to the phase differences between the waveforms transmitted by the transducers 210 may result in the beam 380 being directed towards, and focusing on, the transducers 310 of the receiving wireless power transfer device 100. This may reduce the amount of energy carried by the beam 380 that does not arrive at the transducers 310. The wave front of the beam 380 may have across coherent phase at the transducers 310 of the receiving wireless power transfer device 150. If the beam 280 was transmitted using defined phase patterns from the transducers 310, the wave front of the beam 380 may reproduce the defined phase pattern across the transducers 310.

Figure 8:
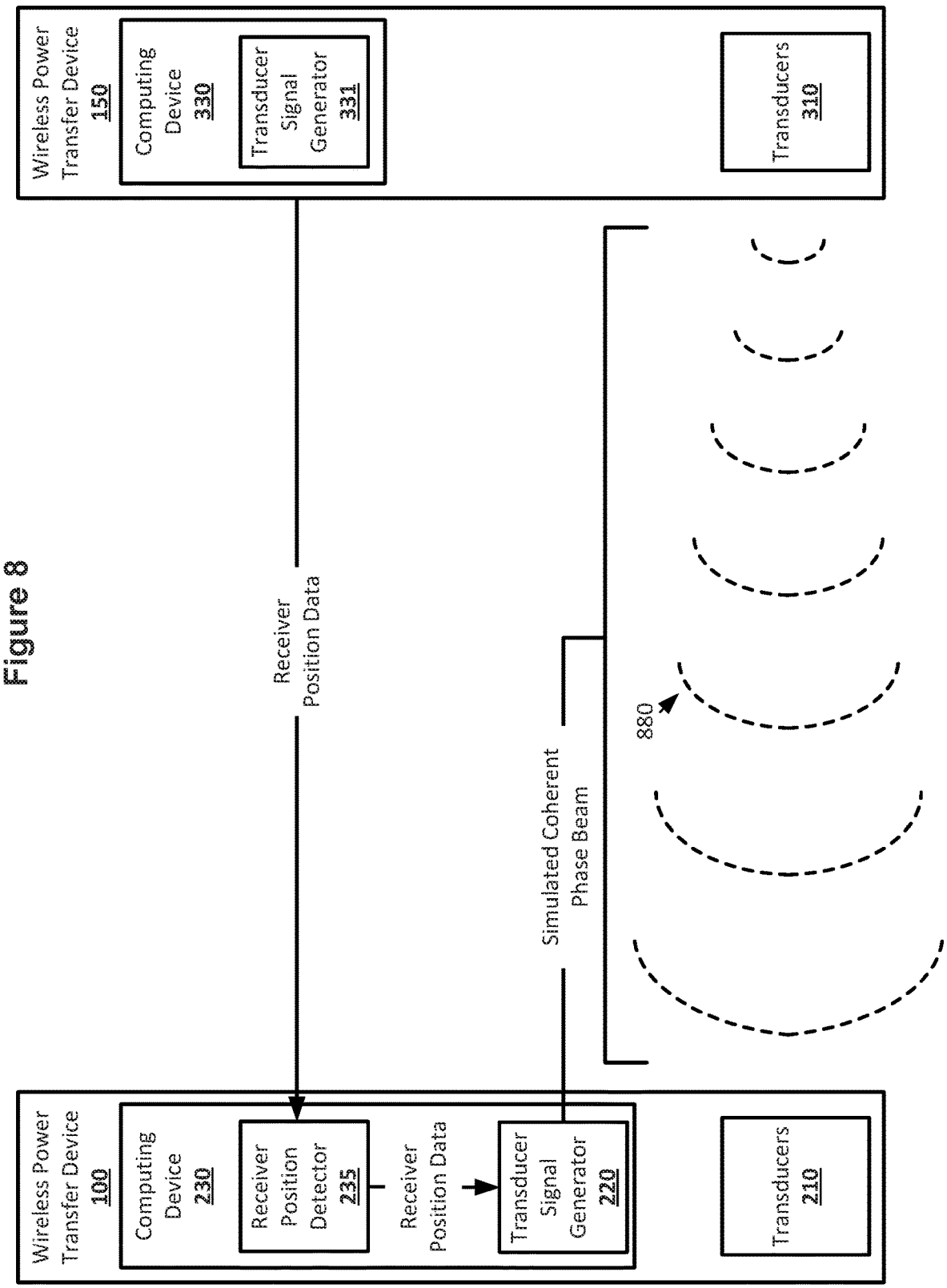
FIG. 8 shows an example arrangement suitable for beamforming for wireless power transfer according to an implementation of the disclosed subject matter.

FIG. 8 shows an example arrangement suitable for beamforming for wireless power transfer according to an implementation of the disclosed subject matter. The transmitting wireless power transfer device 100 may simulate a beam 880 from the transducers 310 of the receiving wireless power transfer device 150. The receiver position detector 235 may receive position data, which may indicate the position of the receiving wireless power transfer device absolutely or relative to the transmitting wireless power transfer device 100. The position data may be generated in any suitable manner, including, for example, based on accelerometer data, gyroscopic data, or other positioning data from the receiving wireless power transfer device 150, any data from any suitable tracking or range finding devices of the transmitting wireless power transfer device 100, including the transducers 210.

The receiver position data may include the distance and angles between the transmitting wireless power transfer device 100 and the receiving wireless power transfer device 150, as any relative angle of orientation or tilt. The receiver position data may also include locations of the transducers 310 on the receiving wireless power transfer device 150, include which surfaces of the receiving wireless power transfer device 150 various transducers are located on and angles at which various transducers may be oriented. The receiver position data may allow the transducer signal generator 231 to know the location of each of the transducers 310 relative to each of the transducers 210.

The transducer signal generator 231 may use the receiver position data to simulate a simulated beam 880 originating from the transducers 310. The simulated beam 880 may be simulated as originating with in phase waveforms transmitted by the transducers 310. The simulated beam 880 may have a coherent phase across the transducers 310, and may propagate towards the transducers 210. The simulation of the propagation of the simulated beam 880 may include any interface between the constituent simulated waveforms, and may account for, for example, the type of wireless power transfer being used and the medium through which the simulated beam 880 travels, and may attempt to account for losses of amplitude during propagation. For example, the simulation may account for ambient air pressure when the simulated beam 880 is a beam of ultrasonic waves. The simulated beam 880 may be simulated from the transducers 310 to the transducers 210. The transducer signal generator 231 determine that phase and amplitude of the wave front of the simulated beam 880 that would be experienced at each of the transducers 880.

The transducer signal generator 231 may simulate the simulated beam 880 in any suitable manner. For example, the transducer signal generator 231 may simulate the simulated beam 880 for each of the transducers individually or as a group, in parallel or in series. For example, the transducer signal generator 231 may simulate the entire simulated beam 880 from the transducers 310 at once, simulating the entire wave front arriving at the transducers 210, or the transducer signal generator 231 may simulate portions of the simulated beam 880, for example, in the channel between the transducers 310 and individual one of the transducers 210 or groups of the transducers 210. Portions of the simulated beam 880 may be simulated in parallel or in series, for example, depending on the computational resources available to the transducer signal generator 231. For example, the portion of the simulated beam 880 between the transducers 210 and the element 111 may be simulated in parallel with a portion other simulated beam 880 between the transducers 210 and the element 112. The simulated beam 880 may be simulated with any suitable granularity. For example, the simulated beam 880 may be simulated at intervals of $\frac{1}{100000}$ of a second. The simulated beam 880 may also be simulated using a calculation or approximation, which may determine the properties of the simulated beam 880 at the transducers 210 directly from the properties of the simulated beam at the transducers 310 without simulating the simulated beam 880 in route between the transducers 310 and the transducers 210.

The transducer signal generator 231 may generate control signals for the generation of a beam by the transducers 210 that may be directed at the receiving wireless power transfer device 150 based on the phases of the wave front of the simulated beam 880 as experienced, in simulation, by the transducers 210. For example, the transducer signal generator 231 generate a control signal that may cause each transducer to transmit with the same phase that was experienced by that transducer. The phase control signals may be sent to the transducer control 220, which may control the transducers 210 to generate a beam, such as the beam 380. The beam 380 may have a coherent phase across the transducers 310. For example, the waveforms generated by the elements 111, 112, 113, 114, 115, 116, 117, 118, and 119 may have various phases, depending on the phase of the wave front of the simulated beam 880 that was experienced, in simulation, by each element. The wave front of the beam 380 may be directed towards, and have a coherent phase across, the elements 151, 152, 153, 154, 155, 156, 157, 158, and 159, such that each element ideally experiences the wave front with the same phase as the other elements. The wave front of the beam 380 may propagate away from the transducers 210 towards the transducers 310.

The simulation of the simulated beam 880 may be performed at any suitable time or interval. For example, the transmitting wireless power transfer device 100 may simulate the simulated beam 880 after communicating in-band or out-of-band with the receiving wireless power transfer device 150. For example, the receiving wireless power transfer device 150 may indicate that it wishes to be a target for wireless power. The simulation of the beam 880 may be performed at any interval, including, for example, on a regular update cycle, for example, to account for a change in the relative positions of the transmitting wireless power transfer device 100 and the receiving wireless power transfer device 150 or to update a previously performed simulation that did not simulate the simulated beam 880 at all of the transducers 210 or from all of the transducers 310. Simulation using calculation or approximation of the properties of the simulated beam 880 at the transducers 210 may allow for faster generation of control signals for the transducers 210 and faster changing of the properties of the beam 380, for example, to keep up with changes in the relative positions of the transmitting wireless power transfer device 100 and the receiving wireless power transfer device 150. For example, as the receiving wireless power transfer device 150 moves, the simulated beam 880 may be rapidly and continuously simulated using calculation or approximation so that the new control signals may be quickly generated based on the new position of the receiving wireless power transfer device 150 and the transducers 210 may transmit the beam 380 using the phases in the new control signals before they are too far out of date due to further movement of the receiving wireless power transfer device 150. The number of transducers 210 used by the transmitting wireless power transfer device 100 may be adjusted, for example, as the simulation of the wave front for additional transducers may increase the overall efficiency of the transfer of wireless power, allowing for fewer transducers to be used to transmit the wireless power.

Figure 9:
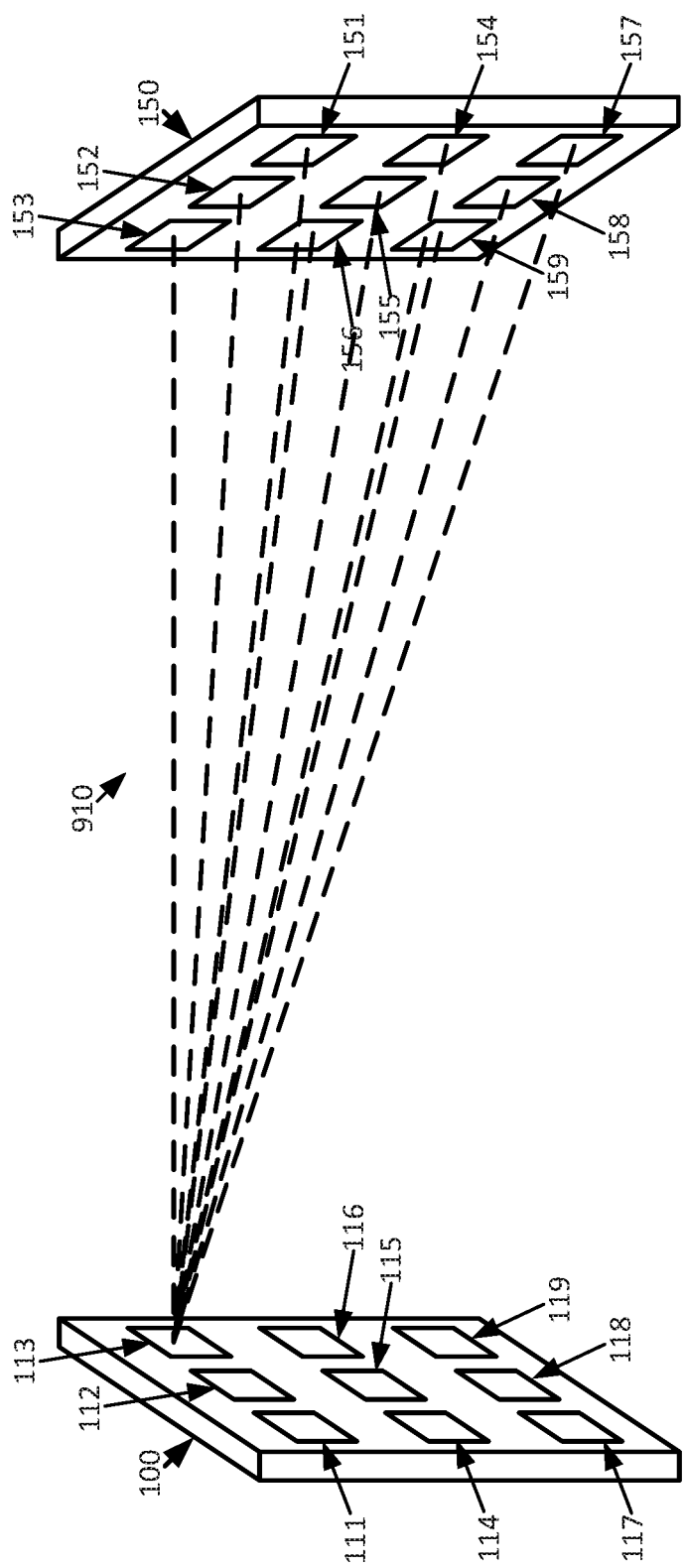
FIG. 9 shows an example arrangement suitable for beamforming for wireless power transfer according to an implementation of the disclosed subject matter.

FIG. 9 shows an example arrangement suitable for beamforming for wireless power transfer according to an implementation of the disclosed subject matter. The simulated beam 880 may be simulated in portions. For example, the channel 910 may be a portion of the simulated beam 880 between the transducers 310 of the receiving wireless power transfer device 150, for example, the elements 151, 152, 153, 154, 155, 156, 157, 158, and 159, and one of the transducers 210, for example, the element 113. The channel 910 may be simulated based on the portions of the simulated waveforms originating at the elements 151, 152, 153, 154, 155, 156, 157, 158, and 159 that account for the wave front of the simulated beam 880 at the element 113. The phase and amplitude of the wave front of the wave front of the simulated beam 880 at the element 113 may be determined based on the simulation of the simulated waveforms in the channel 910. Similarly, additional channels between the elements 151, 152, 153, 154, 155, 156, 157, 158, and 159 and each of the channels 111, 112, 114, 115, 116, 117, 118 and 119 may also be simulated, in parallel or in series with the simulation of the channel 910.

Figure 10:
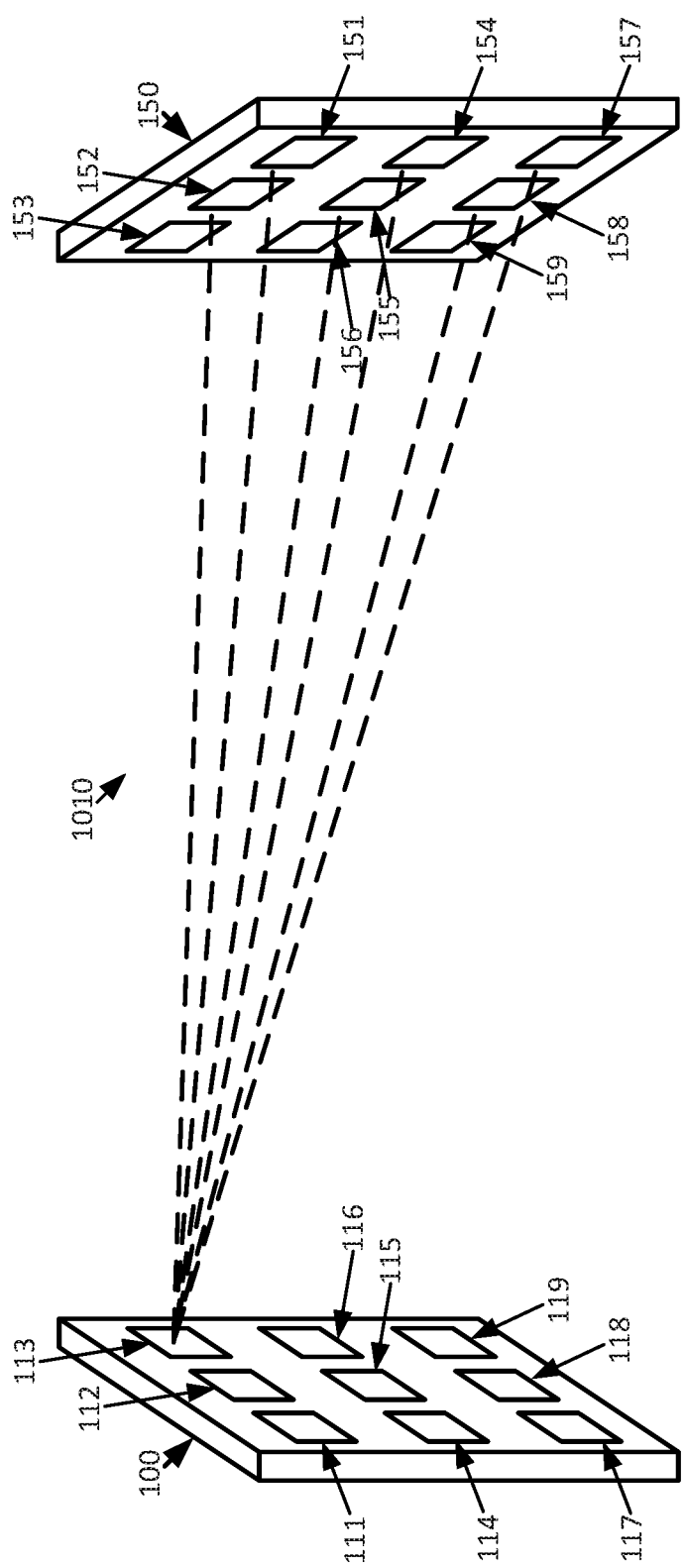
FIG. 10 shows an example arrangement suitable for beamforming for wireless power transfer according to an implementation of the disclosed subject matter.

FIG. 10 shows an example arrangement suitable for beamforming for wireless power transfer according to an implementation of the disclosed subject matter. The simulated beam 880 may be simulated as originating from points on the receiving wireless power transfer device 150 that not be located on the transducers 310. For example, the channel 1010 may be simulated based on waveforms originating from points on the surface of the receiving wireless power transfer device 150 among the elements 151, 152, 153, 154, 155, 156, 157, 158, and 159. Points of origination other than the transducers 310 may be used to reduce the amount computation required to simulate the simulated 880. For example, instead of simulating the waveforms of the simulated beam 880 in the channel 1010 from each of the elements 151, 152, 153, 154, 155, 156, 157, 158, and 159, the channel 1010 may be simulated from six points, with each point in between two adjacent elements on the same row. The phase and amplitude experienced, in simulation, by the element 113 based on the wave front of the portion of the simulated beam 880 in the channel 1010 as simulated based on six points may be approximations of the phase and amplitude the element 113 would experience in simulation if waveforms were simulated from each of the elements 151, 152, 153, 154, 155, 156, 157, 158, and 159.

Figure 11:
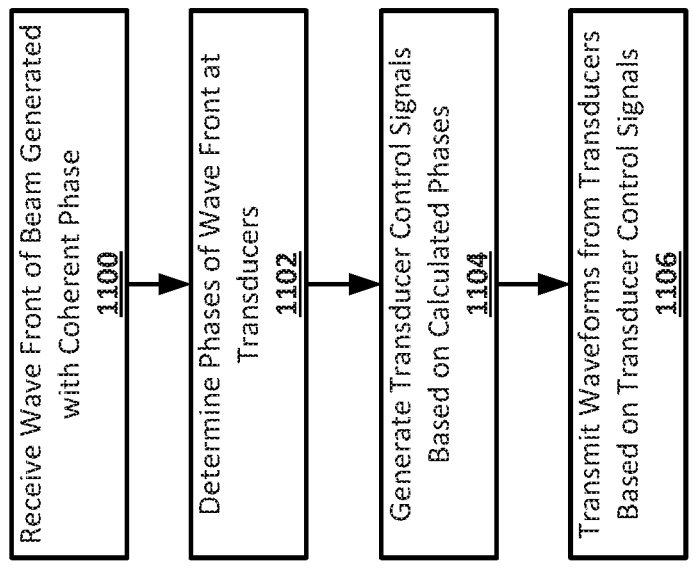
FIG. 11 shows an example procedure suitable for beamforming for wireless power transfer according to an implementation of the disclosed subject matter.

FIG. 11 shows an example procedure suitable for beamforming for wireless power transfer according to an implementation of the disclosed subject matter. At 1100, a wave front of a beam generated with coherent phase may be received. For example, the transducers 210 of the transmitting wireless power transfer device 100 may receive the wave front of the beam 280. The beam 280 may have been generated by the transducers 310 of the of the receiving wireless power transfer device 150. The transducers 310 may generate waveforms in phase, so that the beam 280 may have a coherent phase at its origin. In some implementations, the beam 280 may be generated from waveforms with defined phase patterns.

At 1102, the phases of the wave front may be determined at the transducers. For example, the phases of the wave front of the beam 280 may be determined as experienced at the transducers 210, for example, by any suitable combination of the transducer control 220 and the transducer signal generator 231. The phases may be determined in any suitable manner, using any suitable measurements of any suitable length of time made at any suitable intervals. The amplitude of the wave front of the beam 280 as experienced at the transducers 210 may also be determined. Phase determination may be made for all of the transducers 210, or some subset of the transducers 210, for example, depending on the locations of the transducers 210, as some of the transducers 210 may not receive any part of the wave front of the beam 280.

At 1104, control signals based on the determined phases may be generated. For example, the transducer signal generator 231 may generate control signals which may be used to cause the transducers 210 to transmit waveforms based on the determined phases for each of the transducers 210. The control signals may be any suitable signals that may be used by, for example, the transducer controller 220 to control the transducers 210.

At 1106, waveforms may be transmitted from the transducers based on the transducer control signals. For example, the transducer controller 220 may provide the control signals from the transducer signal generator 231 to the transducers 210. This may cause the transducers 210 to transmit waveforms in accordance with the control signals, for example, with the phases and amplitudes specified in the control signals. The waveforms from the transducers 210 may constitute the beam 380, which may be directed at and focused on the transducers 310, and may have a wave front with a coherent phase across the transducers 310.

Figure 12:
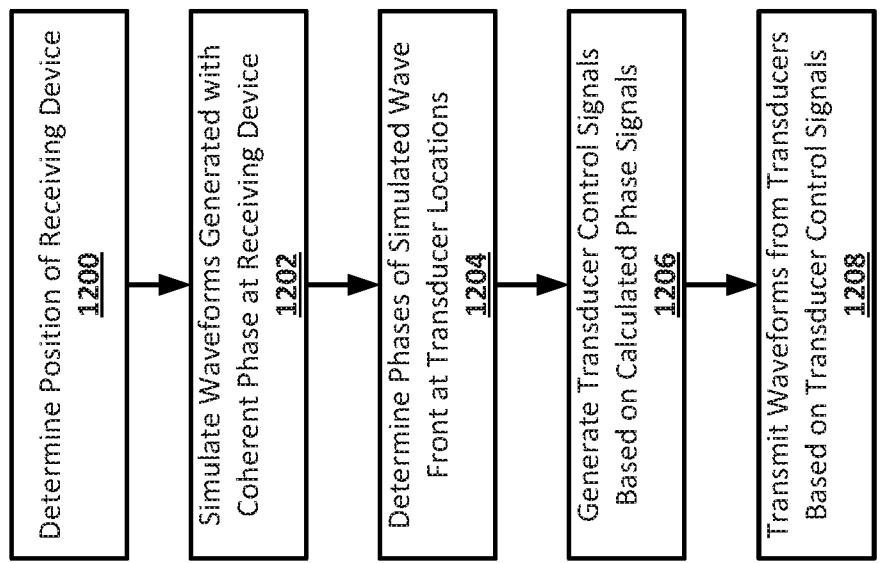
FIG. 12 shows an example procedure suitable for beamforming for wireless power transfer according to an implementation of the disclosed subject matter.

FIG. 12 shows an example procedure suitable for beamforming for wireless power transfer according to an implementation of the disclosed subject matter. At 1200, the position of a receiving device may be determined. For example, the receiver position detector 235 of the transmitting wireless power transfer device 100 may receive position data indicating the position of the receiving wireless power transfer device 150. The receiver position data may include, for example, distance and angles between the transmitting wireless power transfer device 100 and receiving wireless power transfer device 150, the orientation of the receiving wireless power transfer device 150, and the location and orientation of the transducers 310.

At 1202, waveforms generated with a coherent phase at the receiving device may be simulated. For example, the transmitting wireless power transfer device 100 may simulate, using the transducer signal generator 231 and any available computing devices, waveforms generated by the transducers 310 that are in phase. The simulated waveforms may be simulated as originating from the positions of the transducers 310 on the receiving wireless power transfer device 150, or from other selected points on the receiving wireless power transfer device 150, as determined by the receiver position detector 235. The simulated waveforms may constitute the simulated beam 880. The simulated beam 880 may be simulated in its entirety, or may be simulated in portions, for example, based on channels between the transducers 310 and each of the transducers 210.

At 1204, the phases of the simulated wave front may be determined at the transducer location. For example, the phases of the wave front of the simulated beam 880 may be determined as they would be experienced at the locations of the transducers 210, for example, by the transducer signal generator 231. The phases may be determined in any suitable manner, using any suitable measurements of the simulated beam 880 of any suitable length of time made at any suitable intervals. The amplitude of the wave front of the simulated beam 880 as it would be experienced at the transducers 210 may also be determined. Phase determination may be made for all of the transducers 210, or some subset of the transducers 210, for example, depending on computational resources available and the locations of the transducers 210, as some of the transducers 210 may not receive any part of the wave front of the simulated beam 880.

At 1206, control signals based on the determined phases may be generated. For example, the transducer signal generator 231 may generate control signals which may be used to cause the transducers 210 to transmit waveforms based on the determined phases for each of the transducers 210. The control signals may be any suitable signals that may be used by, for example, the transducer controller 220 to control the transducers 210.

At 1208, waveforms may be transmitted from the transducers based on the transducer control signals. For example, the transducer controller 220 may provide the control signals from the transducer signal generator 231 to the transducers 210. This may cause the transducers 210 to transmit waveforms in accordance with the control signals, for example, with the phases and amplitudes specified in the control signals. The waveforms from the transducers 210 may constitute the beam 380, which may be directed at and focused on the transducers 310, and may have a wave front with a coherent phase across the transducers 310.

Figure 13:
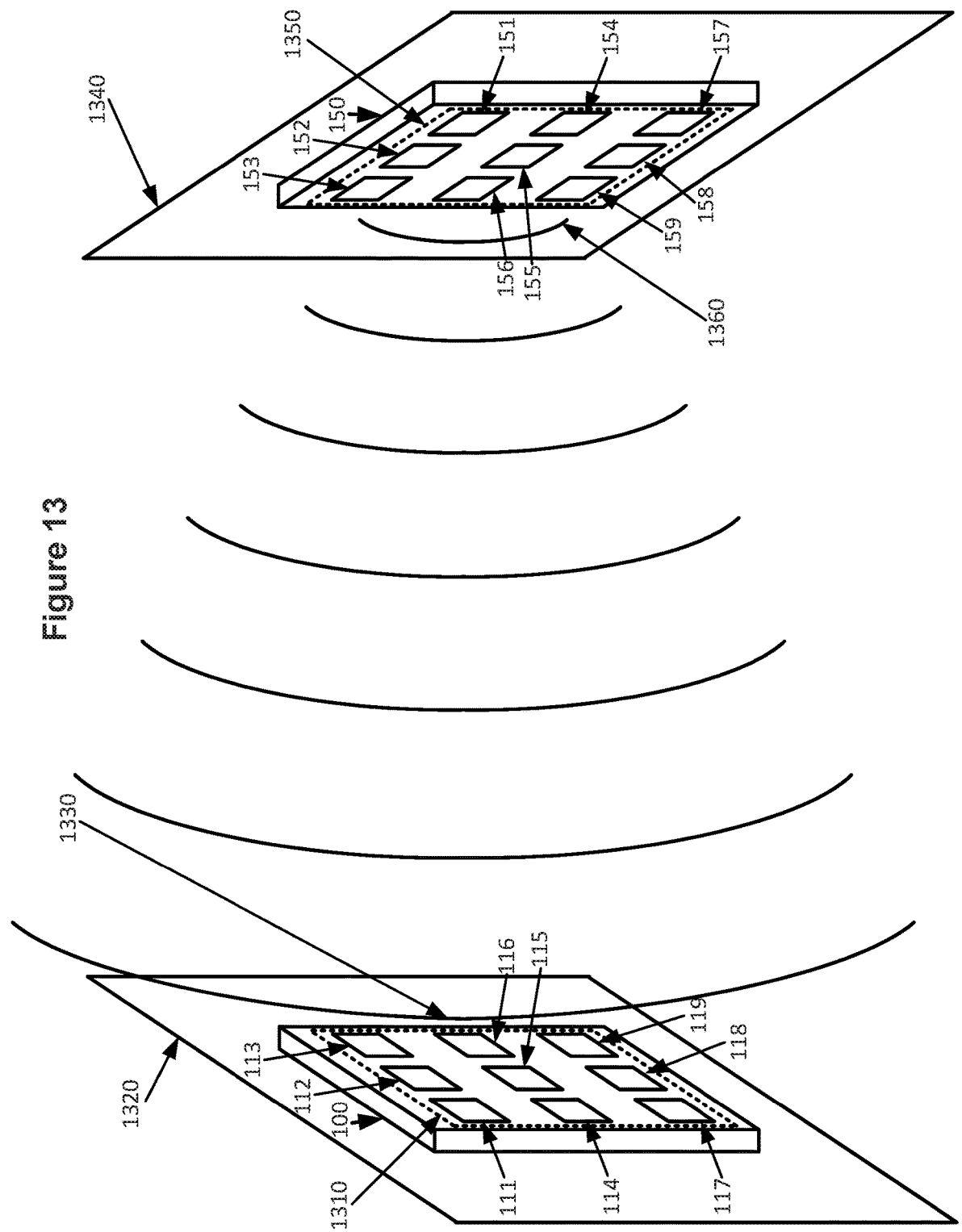
FIG. 13 shows an example system suitable for beamforming for wireless power transfer according to an implementation of the disclosed subject matter.

FIG. 13 shows an example system suitable for beamforming for wireless power transfer according to an implementation of the disclosed subject matter. A notional field $r_{xE}$ 1360 may be emitted from a receiving wireless power transfer device 150. The notional field notional field $r_{xE}$ 1360 may be a notional wave front, and may not be physically emitted from the elements 151, 152, 153, 154, 155, 156, 157, 158, and 159. The notional field $r_{xE}$ 1360 may be represented by a phase/amplitude map $r_{xE}(x, y)$, and may have a linear phase profile in a plane $P_2$ 1340, which may be a plane of an aperture 1350 of the receiving wireless power transfer device 150. The aperture 1350 may be, for example, an area of the receiving wireless power transfer device 150 including elements, such as the elements 151, 152, 153, 154, 155, 156, 157, 158, and 159, which may serve as the source of the notional field $r_{xE}$ 1360. The plane $P_2$ 1340 may be a plane on which the aperture 1350 is located.

A Fourier transform in the plane $P_2$ 1340 of the phase/amplitude map $r_{xE}(x, y)$ for the notional field $r_{xE}$ 1360 may be determined, resulting in a spatial frequency representation in the plane $P_2$ 1340. A Fourier transform may be used to determine $R_{xE}(v_x, v_y)$, which may be the Fourier transform of the phase/amplitude map $r_{xE}(x, y)$, and may be the spatial frequency representation in the plane $P_2$ 1340 of the notional field $r_{xE}$ 1360, that would be emitted from the aperture 1350 of the receiving wireless power transfer device 150 based on the phase/amplitude map $r_{xE}(x, y)$.

The notional field $r_{xE}$, with the phase/amplitude map $r_{xE}(x, y)$, may be propagated from the plane $P_2$ 1340 of the aperture 1350 of the receiving wireless power transfer device 150 to plane $P_1$ 1320 of an aperture 1310 of the transmitting wireless power transfer device 100 in the spatial frequency domain. This may produce a notional field $t_{xR}$ 1330 in the plane $P_1$ 1320. The phase/amplitude map of $t_{xR}(x, y)$ may describe the phase and amplitudes of the notional wave front that would be received at the aperture 1310 of the transmitting wireless power transfer device 100 based on the notional field $r_{xE}$ 1360 with the phase/amplitude map $r_{xE}(x, y)$ being notionally emitted from the aperture 1350 of the receiving wireless power transfer device 150. $t_{xR}(x, y)$ may be determined according to $T_{xR}(v_x, v_y) = R_{xE}(v_x, v_y) H(v_x, v_y)$, where $T_{xR}(v_x, v_y)$ is the Fourier Transform of $t_{xR}(x, y)$, and where $H(v_x, v_y) = e^{jk_z d}$ where $j = \sqrt{-1}$, $$k_z = 2\pi \sqrt{\frac{1}{\lambda^2} - v_x - v_y},$$

$\lambda$ is the wavelength of the plane wave associated with the vector $\vec{k}$, which may be normal to the plane wave, and d is the displacement on the z-axis between the plane $P_2$ 1340 and the plane $P_1$ 1320, where $\vec{k}(v_x, v_y) = \langle k_x, k_y, k_z \rangle$, with $v_x$ and $v_y$ being transverse spatial frequencies in the plane. Additionally, $k_x = 2\pi v_x$ and $k_y = 2\pi v_y$. The magnitude of the plane wave associated with the vector $$\vec{k} = k = \frac{2\pi}{\lambda}.$$

The Fourier transform may be performed by, for example, the transmitting wireless power transfer device 100. For example, the receiver position detector 235 may receive receiver position data from the receiving wireless power transfer device 150. The transducer signal generator 220 may use the receiver position data to determine the location of the notional field $r_{xE}$ 1360 relative to the aperture 1310 in the plane $P_1$ 1320. The transducer signal generator 220 may determine any phase corrections that may be applied if the plane $P_2$ 1340 is not parallel to the plane $P_1$ 1320 as indicated by the receiver position data. The transducer signal generator 220 may then apply a Fourier transform to the phase/amplitude map $r_{xE}(x, y)$ to determine $R_{xE}(v_x, v_y)$, which may be the spatial frequency representation of $r_{xE}(x, y)$ in the aperture 1350. The transducer signal generator 220 may then apply the transformation kernel $H(v_x, v_y)$ to $R_{xE}(v_x, v_y)$ to determine the propagation of the notional field $r_{xE}$ 1360 through free space to the plane $P_1$ 1320 and the aperture 1310, resulting in the spatial frequency representation $T_{xR}(v_x, v_y)$ in the aperture 1310. The transducer signal generator 220 may then apply an inverse Fourier transform to $T_{xR}(v_x, v_y)$. The result may be the notional field $t_{xR}$ 1330 and its corresponding phase/amplitude map $t_{xR}(x, y)$ at the aperture 1310.

Figure 14:
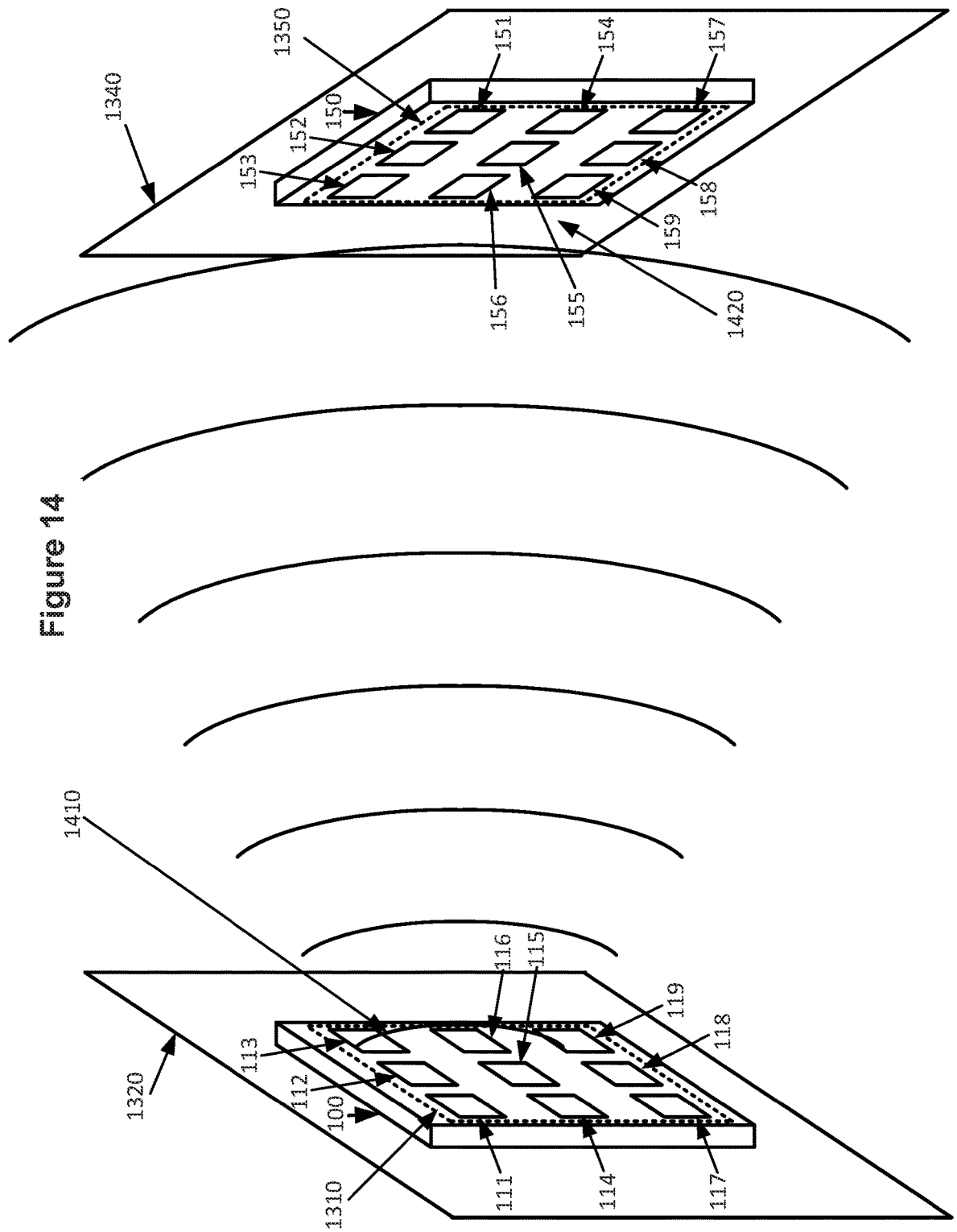
FIG. 14 shows an example system suitable for beamforming for wireless power transfer according to an implementation of the disclosed subject matter.

FIG. 14 shows an example system suitable for beamforming for wireless power transfer according to an implementation of the disclosed subject matter. The phase/amplitude map $t_{xR}(x, y)$ may be windowed to the aperture 1310 of the transmitting wireless power transfer device 100 and a phase conjugate may be applied to the complex amplitude/phase signal to determine the phase/amplitude map that may reconstruct the notional field $r_{xE}$ 1360 represented by the phase/amplitude map $r_{xE}(x, y)$ at the aperture 1350 of the receiving wireless power transfer device 150. Resampling of the phase/amplitude map $t_{xR}(x, y)$ may be necessary if the pitch of the constructed plane $P_2$ 1340 of the aperture 1350 of the receiving wireless power transfer device 150 does not correspond to the element pitch of the transmitting wireless power transfer device 100.

For example, $t_{xE}(x, y)$ may be the phase/amplitude map of the physical field $t_{xE}$ 1410 emitted by elements of the transmitting wireless power transfer device 100, for example, as an ultrasonic beam, intended to produce the desired complex field in the $P_2$ 1340 of the aperture 1350 of the receiving wireless power transfer device 150. The phase/amplitude map $t_{xE}(x, y)$ may map the physical field $t_{xE}$ 1410 at the elements of the transmitting wireless power transfer device 100. $t_{xE}(x, y)$ may be determined in the spatial domain according to $t_{xE}(x, y) = t_{xR}^*(x, y) A_{tx}(x, y)$ where $t_{xR}^*(x, y)$ is the complex conjugate of $t_{xR}(x, y)$, and $A_{tx}(x, y)$ is the aperture 1310 of the transmitting wireless power transfer device 100, as only the portion of $t_{xR}(x, y)$ which overlaps the aperture 1310 of the transmitting wireless power transfer device 100 may be physically phase-conjugated and re-radiated by the elements of the transmitting wireless power transfer device 100.

The magnitude of the phase/amplitude map $t_{xE}(x, y)$ may be normalized to optimize the desired power level transmitted from the transmitting wireless power transfer device 100. This may include maximizing the power transmitted by the transmitting wireless power transfer device 100, tuning to a particular desired power level, for example, as indicated by the receiving wireless power transfer device, 150 and dividing the total available power of the transmitting wireless power transfer device 100 over multiple receiving wireless power transfer devices 150. Apertures may be combined through linear superposition. Normalization and prediction of power delivered may be determined prior to or after the combination of apertures depending upon the result desired.

$r_{xR}(x, y)$ may be the phase/amplitude map of the physical field $r_{xR}$ 1420 received in the plane $P_2$ 1340 of the aperture 1350 of the receiving wireless power transfer device 150, for example, as the wave front of an ultrasonic beam from the elements of the transmitting wireless power transfer device 100. When the transmitting wireless power transfer devices 100 emits a physical field, such as the ultrasonic beam, based on the phase/amplitude map $t_{xE}(x, y)$, the phase/amplitude map $r_{xR}(x, y)$ may be predicted by $R_{xR}(v_x, v_y) = T_{xE}(v_x, v_y) H(v_x, v_y)$ where $T_{xE}(v_x, v_y)$ is the Fourier transform of $t_{xE}(x, y)$ and $R_{xR}(v_x, v_y)$ is the Fourier transform of $r_{xR}(x, y)$.

For example, the transducer signal generator 231 may generate phase control signals which may be sent to the transducer control 220. The phase control signals may then be used to control the transducers 210, resulting in the transducers 210 outputting the physical field $t_{xE}$ 1410, which may be an ultrasonic beam such as the beam 380, with the phase/amplitude map of $t_{xE}(x, y)$ at the location of the transducers 210. This may result in the production of the physical field $r_{xR}$ 1420 at the transducers 310 of the receiving wireless power transfer device 100, for example, in the form of a wave front of the beam 380. The phase/amplitude map at the transducers 310 may be, for example, $r_{xR}(x, y)$, and may have coherent phase and uniform amplitude.

Figure 15:
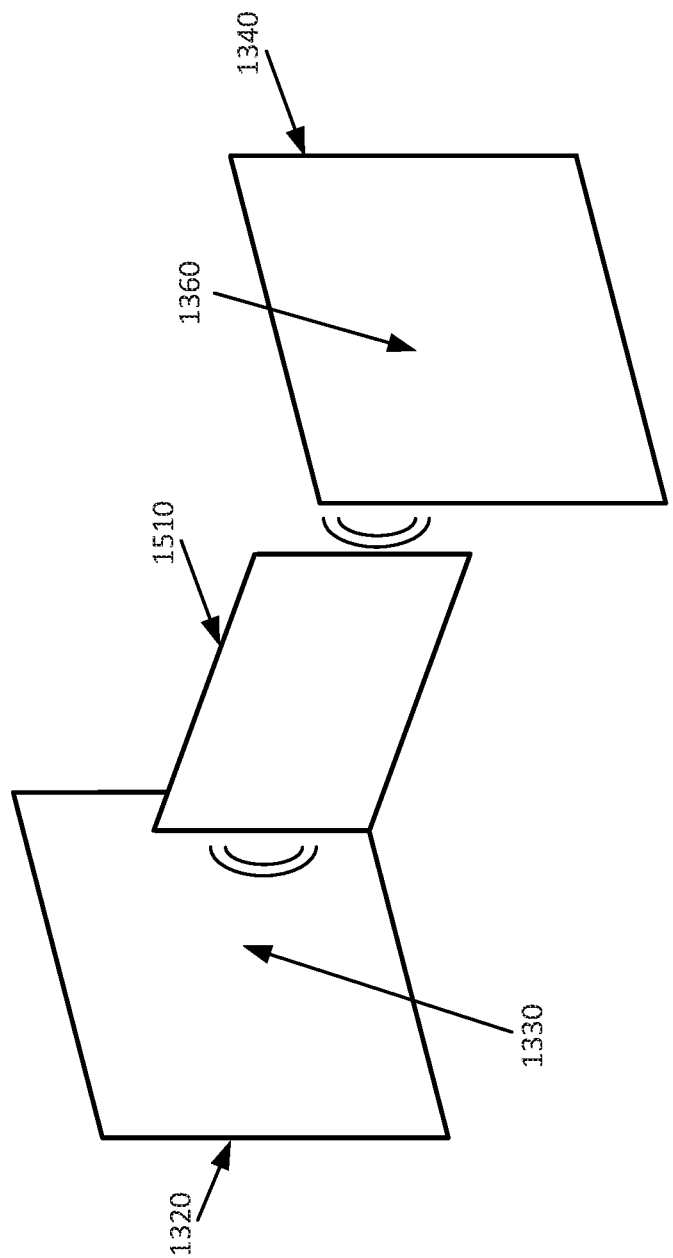
FIG. 15 shows an example system suitable for beamforming for wireless power transfer according to an implementation of the disclosed subject matter.

FIG. 15 shows an example system suitable for beamforming for wireless power transfer according to an implementation of the disclosed subject matter. A transformation kernel 1510 may be used to determine the notional field the notional field $t_{xR}$ 1330 from the notional field notional field $r_{xE}$ 1360. The transformation kernel 1510 may be, for example, $H(v_x, v_y)$ and may be a spatial-frequency domain transfer function that may define the Fourier transform of the point spread function for Fraunhofer diffraction at the orthonormal distance between the aperture 1320 of the transmitting wireless power transfer device 100 and the center point of the aperture 1350 of the receiving wireless power transfer device 150.

Figure 16:
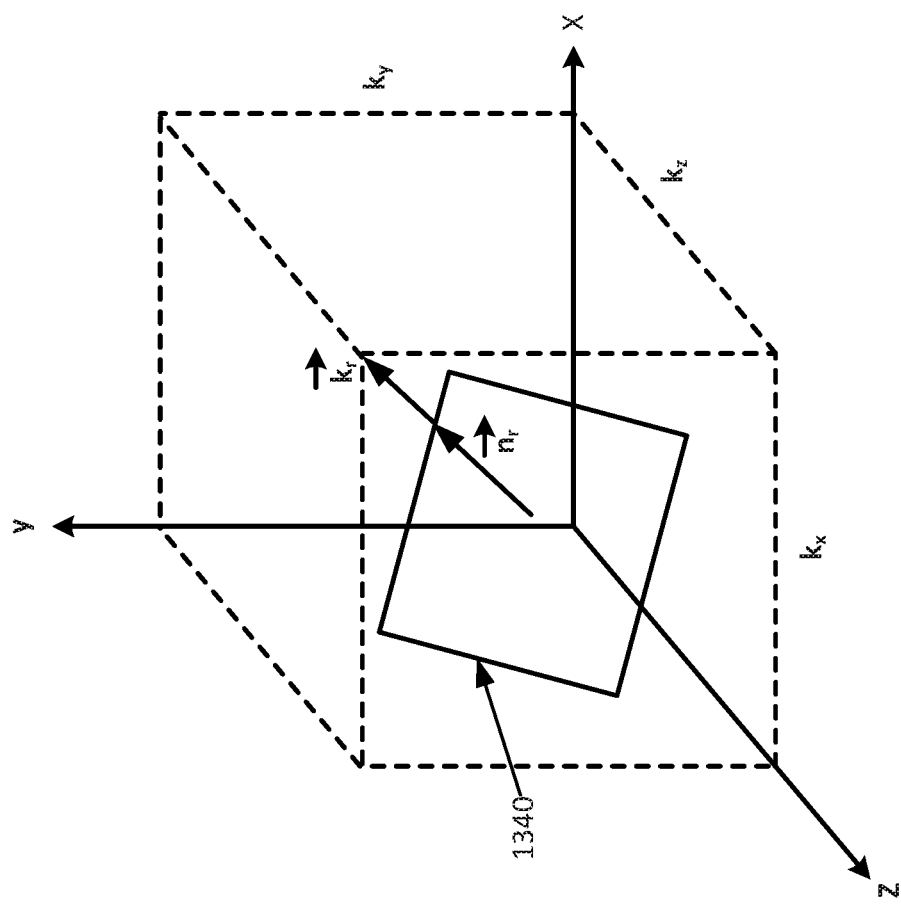
FIG. 16 shows an example arrangement suitable for beamforming for wireless power transfer according to an implementation of the disclosed subject matter.

FIG. 16 shows an example arrangement suitable for beamforming for wireless power transfer according to an implementation of the disclosed subject matter. The plane $P_2$ 1340 of the aperture 1350 of the receiving wireless power transfer device 150 may not be parallel to the plane $P_1$ 1320, for example, due to the receiving wireless power transfer device 150 being oriented at angle to the transmitting wireless power transfer device 100, or due to the arrangement of elements on the receiving wireless power transfer device 150 and/or the transmitting wireless power transfer device 100. Phase corrections may be determined that may be applied to each element of the aperture 1350 of the receiving wireless power transfer device 150 to make the aperture 1350 of the receiving wireless power transfer device 150 quasi-parallel to the plane $P_1$ 1320 of the aperture 1310 of the transmitting wireless power transfer device 100. For example, a first-order approximation may be made that the apparent width of the aperture 1310 of the transmitting wireless power transfer device 100 remains constant from the perspective of the plane $P_2$ 1340 of the aperture 1350 of the receiving wireless power transfer device 150, for example, as a square aperture driven with equal amplitude across its face. If the receiving wireless power transfer device 150 has a flat phase profile across its surface then the resulting phase profile, as part of a phase/amplitude map, in the parallel plane, for example, the plane $P_1$ 1320 of the aperture 1310 of the transmitting wireless power transfer device 100, may be calculated by normalizing the receiving wireless power transfer device's actual surface normal unit vector $\vec{n}_r$ to length $$|\vec{k}| = \frac{2\pi}{\lambda}$$

and taking it to be the central $\vec{k}$ of the emitted angular spectrum from the aperture 1350 of the receiving wireless power transfer device 100, $\lambda$ is the wavelength of the plane wave associated with the vector $\vec{k}$, which may be normal to the plane wave. The phase profile of the phase/amplitude map $r_{xE}(x, y)$ at the plane $P_2$ 1350 may be approximately given by $\phi_r(x, y) = e^{-i(k_{rx}x + k_{ry}y)}$ where $\vec{k}_r = \langle k_{rx}, k_{ry}, k_{rz} \rangle = |\vec{k}| \cdot \vec{n}_r$.

This may be a rotation of a true flat phase profile of the aperture 1350 of the receiving wireless power transfer device 150 to give the notional field $r_{xE}$ 1360, or wave front, represented by the phase/amplitude map $r_{xE}(x, y)$, a linear phase profile in the plane $P_2$ 1340 by multiplication by a complex exponential. This may be a shift of the angular spectrum in spatial frequency to be centered around $(v_{rx}, v_{ry})=(k_{rx}, k_{ry})/2\pi$. Similarly, after $r_{xR}(x, y)$, which may be the phase/amplitude map for the physical field $r_{xR}$ 1420, or wave front, received at the elements of the aperture 1340 of the receiving wireless power transfer device 150 is calculated in the plane $P_2$ 1340 it may be rotated back into the plane $P_2$ 1340 of the aperture 1340 of the receiving wireless power transfer device 150 by division by the same complex exponential.

Figure 17:
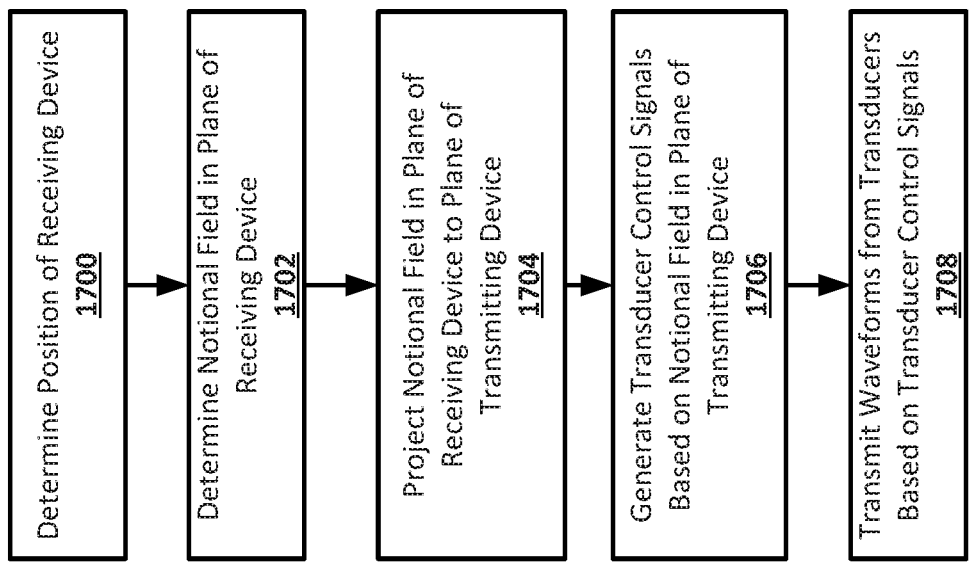
FIG. 17 shows an example process suitable for beamforming for wireless power transfer according to an implementation of the disclosed subject matter.

FIG. 17 shows an example process suitable for beamforming for wireless power transfer according to an implementation of the disclosed subject matter. At 1700, the position of a receiving device may be determined. For example, the receiver position detector 235 of the transmitting wireless power transfer device 100 may receive position data indicating the position of the receiving wireless power transfer device 150. The receiver position data may include, for example, distance and angles between the transmitting wireless power transfer device 100 and receiving wireless power transfer device 150, the orientation of the receiving wireless power transfer device 150, and the location and orientation of the transducers 310.

At 1702, a notional field in the plane of the receiving device may be determined. For example, the transmitting wireless power transfer device 100 may determine, using the transducer signal generator 231 and any available computing devices, a representation of the notional field $r_{xE}$ 1360 in the plane $P_2$ 1340 of the aperture 1350. The notional field notional field $r_{xE}$ may be represented as originating from the positions of the transducers 310 on the receiving wireless power transfer device 150, or from other selected points on the receiving wireless power transfer device 150, as determined by the receiver position detector 235. The representation may be, for example, the phase/amplitude map $r_{xE}(x, y)$, which may represent the phase and amplitude of the notional field $r_{xE}$ 1360 at the location of the transducer 310, for example, in the aperture 1350.

At 1704, the notional field in the plane of the receiving device may be projected to the plane of the transmitting device. For example, the transducer signal generator 231 may determine the phase/amplitude map $t_{xR}(x, y)$ of the notional field notional field $t_{xR}$ 1330 in the plane $P_1$ 1320 of the aperture 1310, for example, at the transducers 210, based on the propagation of the notional field $r_{xE}$ 1360 from the plane $P_2$ 1340 to the plane $P_1$ 1320. The propagation may be determined by, for example, use of Fourier transforms. For example, the transducer signal generator 231 may determine $R_{xE}(v_x, v_y)$, which may be the Fourier transform of the phase/amplitude map $r_{xE}(x, y)$, and may be the spatial frequency representation in the plane $P_2$ 1340 of the notional field $r_{xE}$ 1360. $t_{xR}(x, y)$ may be determined according to $T_{xR}(v_x, v_y)=R_{xE}(v_x, v_y)H(v_x, v_y)$, where $T_{xR}(v_x, v_y)$ is the Fourier Transform of $t_{xR}(x, y)$, and where $H(v_x, v_y)=e^{jk_zd}$ where $$j = \sqrt{-1}, k_z = 2\pi\sqrt{\frac{1}{\lambda^2} - v_x - v_y},$$

$\lambda$ is the wavelength of the plane wave associated with the vector $\vec{k}$, which may be normal to the plane wave, and d is the displacement on the z-axis between the plane $P_2$ 1340 and the plane $P_1$ 1320. $\vec{k}(v_x, v_y)=\langle k_x, k_y, k_z\rangle$, with $v_x$ and $v_y$ being transverse spatial frequencies in the plane. $k_x=2\pi v_x$ and $k_y=2\pi v_y$. The magnitude of the plane wave associated with the vector $$\vec{k} = k = \frac{2\pi}{\lambda}.$$

At 1706, control signals based on the notional field in the plane of the transmitting device may be generated. For example, the transducer signal generator 231 may generate control signals which may be used to cause the transducers 210 to transmit waveforms based on the phase/amplitude map $t_{xR}(x, y)$ for the notional field $t_{xR}$ 1330. The control signals may be based on the phase/amplitude map $t_{xE}(x, y)$ which may map the physical field $t_{xE}$ 1410. The phase/amplitude map $t_{xR}(x, y)$ may be windowed to the aperture 1310 of the transmitting wireless power transfer device 100 and a phase conjugate may be applied to the complex amplitude/phase signal according to $t_{xE}(x, y)=t_{xR}^*(x, y)A_{tx}(x, y)$ where $t_{xR}^*(x, y)$ is the complex conjugate of $t_{xR}(x, y)$, and $A_{tx}(x, y)$ is the aperture 1310 of the transmitting wireless power transfer device 100. Resampling of the phase/amplitude map $t_{xR}(x, y)$ may be necessary if the pitch of the constructed plane $P_2$ 1340 of the aperture 1350 of the receiving wireless power transfer device 150 does not correspond to the element pitch of the transmitting wireless power transfer device 100. The control signals may be any suitable signals that may be used by, for example, the transducer controller 220 to control the transducers 210.

At 1708, waveforms may be transmitted from the transducers based on the transducer control signals. For example, the transducer controller 220 may provide the control signals from the transducer signal generator 231 to the transducers 210. This may cause the transducers 210 to transmit waveforms in accordance with the control signals, for example, with the phases and amplitudes specified in the control signals. The waveforms from the transducers 210 may constitute the beam 380, which may be directed at and focused on the transducers 310, and may have a wave front with a coherent phase across the transducers 310.

Figure 18:
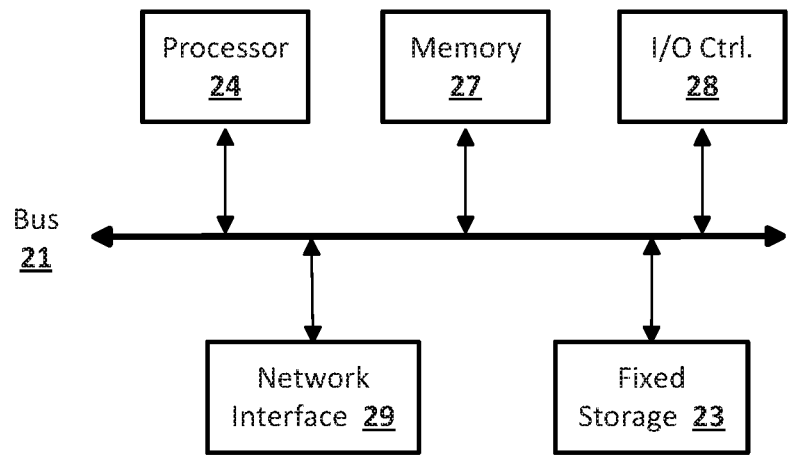
FIG. 18 shows a computer according to an embodiment of the disclosed subject matter.

Embodiments of the presently disclosed subject matter may be implemented in and used with a variety of component and network architectures. FIG. 18 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 19.

Many other devices or components (not shown) may be connected in a similar manner, such as document scanners, digital cameras, auxiliary, supplemental, or backup systems, or the like. Conversely, all of the components shown in FIG. 18 need not be present to practice the present disclosure. The components can be interconnected in different ways from that shown. The operation of a computer such as that shown in FIG. 18 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 19:
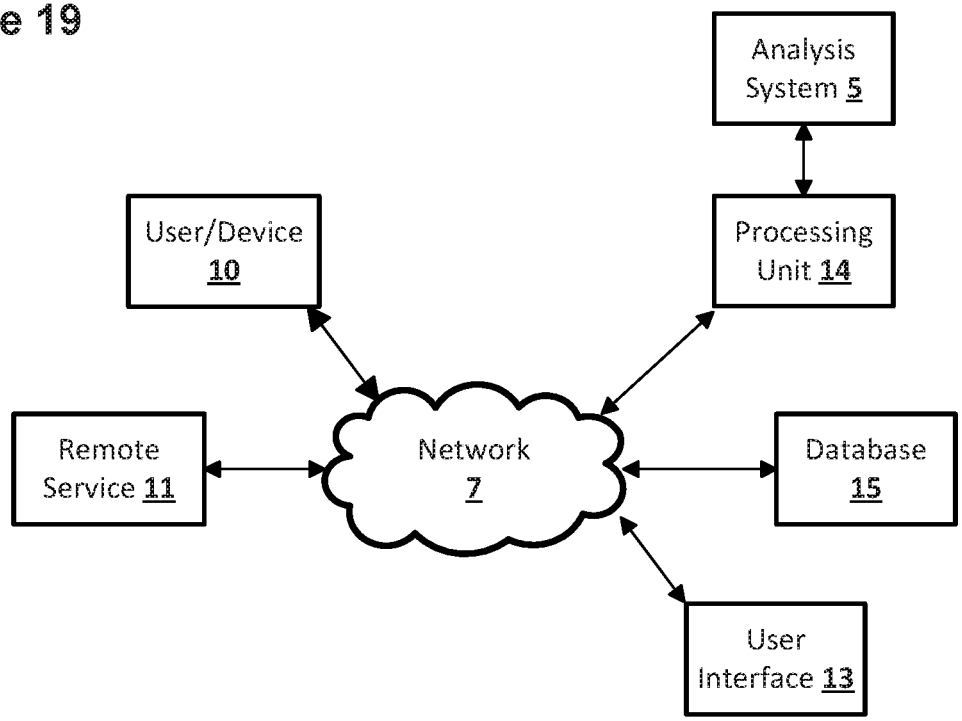
FIG. 19 shows a network configuration according to an embodiment of the disclosed subject matter.

FIG. 19 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
generating a spatial frequency representation of a notional field in a plane of an aperture of a first wireless power transfer device;
determining a phase/amplitude map for a second notional field in a plane of an aperture of a second wireless power transfer device based on the spatial frequency representation of the notional field in the plane of the aperture of the first wireless power transfer device and a position of the first wireless power transfer device relative to the second wireless power transfer device; and
generating control signals for one or more transducer elements of the second wireless power transfer device based on the determined phase/amplitude map for the second notional field in the plane of the aperture of the second wireless power transfer device.

2. The method of claim 1, wherein generating a spatial frequency representation of the notional field in the plane of the aperture of the first wireless power transfer device further comprises performing a Fourier transform on a phase/amplitude map for the notional field in the plane of the aperture of the first wireless power transfer device.

3. The method of claim 1, further comprising:
supplying the control signals for the one or more transducer elements to the one or more transducer elements; and
transmitting waveforms from the one or more transducer elements based on the supplied control signals.

4. The method of claim 1, wherein determining a phase/amplitude map for a second notional field in a plane of an aperture of the second wireless power transfer device based on the spatial frequency representation of the notional field in the plane of the aperture of the second wireless power transfer device and the position of the first wireless power transfer device further comprises:
determining a spatial frequency representation of the second notional field based on a propagation of the notional field from the plane of the aperture of the first wireless power transfer device to the plane of the aperture of the second wireless power transfer device; and
performing an inverse Fourier transform on the spatial frequency representation of the second notional field to determine the phase/amplitude map of the second notional field.

5. The method of claim 1, wherein determining a spatial frequency representation of the phase/amplitude map of the second notional field based on a propagation of the notional field from the plane of the aperture of the first wireless power transfer device to the plane of the aperture of the second wireless power transfer device further comprises:
applying a transformation kernel to the spatial frequency representation of the notional field in the plane of the aperture of the first wireless power transfer device to determine the spatial frequency representation of the second notional field in the plane of the aperture of the second wireless power transfer device.

6. The method of claim 1, wherein generating control signals for one or more transducer elements of the second wireless power transfer device based on the determined phase/amplitude map for the second notional field in the plane of the aperture of the second wireless power transfer device further comprises:
   windowing the complex conjugate of the determined phase/amplitude map for the second notional field in the plane of the aperture of the second wireless power transfer device to the aperture of the second wireless power transfer device.

7. The method of claim 1, further comprising determining phase corrections for the aperture of the first wireless power transfer device that make the phase/amplitude map of the notional field quasi-parallel to the plane of the aperture of the second wireless power transfer device.

8. The method of claim 1, wherein the phase/amplitude map of the notional field comprises coherent phase.

9. A system for beamforming for wireless power transfer comprising:
   a plurality of elements adapted and configured to transmit waveforms for a transmitted beam based on supplied control signals;
   a receiver position detector adapted to determine a position of a receiving wireless power transfer device; and
   a computing device comprising a transducer signal generator configured to generate a spatial frequency representation of a notional field in a plane of an aperture of a receiving wireless power transfer device, determine a phase/amplitude map for a second notional field in a plane of an aperture of a transmitting wireless power transfer device comprising the plurality of elements based on the spatial frequency representation of the notional field in the plane of the aperture of the receiving wireless power transfer device and the position of the receiving wireless power transfer device, and generate control signals for one or more of the plurality of elements based on the determined phase/amplitude map for the second notional field in the plane of the aperture of the transmitting wireless power transfer device.

10. The system of claim 9, wherein the transducer signal generator generates the spatial frequency representation of the notional field in the plane of the aperture of the receiving wireless power transfer device by performing a Fourier transform on a phase/amplitude map for the notional field in the plane of the aperture of the receiving wireless power transfer device.

11. The system of claim 9, wherein the transducer signal generator is further configured to supply the control signals for one or more of the plurality of elements to the one or more of the plurality of elements.

12. The system of claim 11, further comprising a transducer control adapted and configured to receive the control signals from the transducer signal generator and supply the control signals to the one or more of the plurality of elements.

13. The system of claim 9, wherein the aperture of the receiving wireless power transfer device is located at one or more transducer elements of the receiving wireless power transfer device.

14. The system of claim 10, wherein the phase/amplitude map represents the notional field in the plane of the aperture of the receiving wireless power transfer device at the one or more transducer elements of the receiving wireless power transfer device.

15. The system of claim 10, wherein the transducer signal generator is configured to determine the phase/amplitude map for the second notional field in a plane of the aperture of the transmitting wireless power transfer device based on the spatial frequency representation of the notional field in the plane of the aperture of the receiving wireless power transfer device and the position of the receiving wireless power transfer device by determining a spatial frequency representation of the second notional field based on a propagation of the notional field from the plane of the aperture of the receiving wireless power transfer device to the plane of the aperture of the transmitting wireless power transfer device, and performing an inverse Fourier transform on the spatial frequency representation of the second notional field to determine the phase/amplitude map of the second notional field.

16. The system of claim 15, wherein the wherein the transducer signal generator is configured to determine the spatial frequency representation of the phase/amplitude map of the second notional field based on the propagation of the notional field from the plane of the aperture of the receiving wireless power transfer device to the plane of the aperture of the transmitting wireless power transfer device by applying a transformation kernel to the spatial frequency representation of the notional field in the plane of the aperture of the receiving wireless power transfer device to determine the spatial frequency representation of the second notional field in the plane of the aperture of the transmitting wireless power transfer device.

17. The system of claim 9, wherein the transducer signal generator is configured to generate control signals for the one or more of the plurality of transducer elements of the transmitting wireless power transfer device based on the determined phase/amplitude map for the second notional field in the plane of the aperture of the transmitting wireless power transfer device by windowing the complex conjugate of the determined phase/amplitude map for the second notional field in the plane of the aperture of the transmitting wireless power transfer device to the aperture of the transmitting wireless power transfer device.

18. The system of claim 9, further comprising determining phase corrections for the aperture of the receiving wireless power transfer device that make the phase/amplitude map of the notional field quasi-parallel to the plane of the aperture of the transmitting wireless power transfer device.

19. The method of claim 9, wherein the phase/amplitude map of the notional field comprises coherent phase.

20. A system comprising: one or more computers and one or more storage devices storing instructions which are operable, when executed by the one or more computers, to cause the one or more computers to perform operations comprising:
   generating a spatial frequency representation of a notional field in a plane of an aperture of a first wireless power transfer device;
   determining a phase/amplitude map for a second notional field in a plane of an aperture of a second wireless power transfer device based on the spatial frequency representation of the notional field in the plane of the aperture of the first wireless power transfer device and a position of the first wireless power transfer device relative to the second wireless power transfer device; and
   generating control signals for one or more transducer elements of the second wireless power transfer device based on the determined phase/amplitude map for the second notional field in the plane of the aperture of the second wireless power transfer device.

* * * * *